United States Patent
George

(10) Patent No.: US 8,069,122 B2
(45) Date of Patent: Nov. 29, 2011

(54) PREDICTIVE COST REDUCTION BASED ON A THERMODYNAMIC MODEL

(75) Inventor: Michael L. George, Dallas, TX (US)

(73) Assignee: Accenture Global Services Limited, Dublin (IE)

( * ) Notice: Subject to any disclaimer, the term of this patent is extended or adjusted under 35 U.S.C. 154(b) by 656 days.

(21) Appl. No.: 12/052,533

(22) Filed: Mar. 20, 2008

(65) Prior Publication Data
US 2008/0235067 A1 Sep. 25, 2008

Related U.S. Application Data

(60) Provisional application No. 60/919,105, filed on Mar. 20, 2007, provisional application No. 60/919,289, filed on Mar. 21, 2007.

(51) Int. Cl.
*G06F 17/00* (2006.01)
*G06F 17/50* (2006.01)
*G05B 13/02* (2006.01)

(52) U.S. Cl. .................. 705/400; 705/7; 703/2; 700/36

(58) Field of Classification Search .................. 705/400, 705/7, 8, 9, 10, 11, 29, 30; 700/28–35, 36, 700/44–46, 67; 703/2; 702/182
See application file for complete search history.

(56) References Cited

U.S. PATENT DOCUMENTS

| | | | |
|---|---|---|---|
| 3,845,286 A | 10/1974 | Aronstein et al. | |
| 3,891,836 A | 6/1975 | Lee | |
| 4,058,711 A | 11/1977 | Ondercin et al. | |
| 4,628,434 A | 12/1986 | Tashiro et al. | |
| 4,644,480 A | 2/1987 | Haruna et al. | |
| 4,729,105 A | 3/1988 | Thompson et al. | |
| 4,796,194 A | 1/1989 | Atherton | |
| 4,802,094 A | 1/1989 | Nakamura et al. | |
| 4,896,269 A | 1/1990 | Tong | |
| 4,975,827 A * | 12/1990 | Yonezawa | 700/31 |
| 5,195,041 A | 3/1993 | George et al. | |
| 5,216,593 A | 6/1993 | Dietrich et al. | |
| 5,231,567 A | 7/1993 | Matoba et al. | |

(Continued)

FOREIGN PATENT DOCUMENTS
SU 930320 A1 5/1982

OTHER PUBLICATIONS

A.M. Tsirlin, Vladimir Kaskov and N.A. Kolinko Program System Institute, Russian Academy of Science; Jun. 16, 2003; tsirlin@sarc.botik.ru; Vladimir.Kaszakov@uts.edu.au; Titled: A minimal dissipation type-based classification in irreversible thermodynamics and microeconomics; 16 pages.

(Continued)

Primary Examiner — Igor Borissov
(74) Attorney, Agent, or Firm — Fish & Richardson P.C.

(57) ABSTRACT

Predictive cost reduction based on a thermodynamic model, in which parameters associated with a process are accessed. The parameters include a quantity of units of work-in-process at first and second times, and first and second constants respectively indicative of growth between the first and second times, and of a translated reduction of the work-in-process to a reduction of cost. A thermodynamic model is applied to the accessed parameters, and a predictive cost reduction associated with an improvement of the process based on applying the thermodynamic model is output.

18 Claims, 8 Drawing Sheets

U.S. PATENT DOCUMENTS

| | | | |
|---|---|---|---|
| 5,280,425 | A | 1/1994 | Hogge |
| 5,351,195 | A | 9/1994 | Sherman |
| 6,038,540 | A * | 3/2000 | Krist et al. .................. 705/7.33 |
| 6,993,492 | B2 | 1/2006 | George et al. |
| 7,415,421 | B2 | 8/2008 | Tu et al. |
| 7,489,990 | B2 * | 2/2009 | Fehr et al. .................. 700/291 |
| 2003/0014225 | A1 * | 1/2003 | De Vicente .................. 703/2 |
| 2004/0181498 | A1 * | 9/2004 | Kothare et al. .................. 706/45 |
| 2004/0260592 | A1 | 12/2004 | George et al. |
| 2005/0222867 | A1 | 10/2005 | Underwood et al. |
| 2005/0273305 | A1 * | 12/2005 | Thalhammer-Reyero ...... 703/11 |
| 2006/0031048 | A1 | 2/2006 | Gilpin et al. |
| 2006/0100890 | A1 | 5/2006 | Macy et al. |
| 2006/0259163 | A1 * | 11/2006 | Hsiung et al. .................. 700/30 |
| 2007/0100486 | A1 | 5/2007 | Burda et al. |

OTHER PUBLICATIONS

John Bryant; Titled: A Theromdynamic Theory of Economics; Final Post Review Version; john.bryant@vocat.co.uk; 31 pages.

E.W. Piotrowski and J. Sladkowski; Titled: The Thermodynamics of Portfolios; Institute of Theoretical Physics, University of Bialystok; ep@alpha.uwb.edu.pl ; sladk@us.edu.pl; 8 pages.

"Thermodynamic analogies in economics and finance: instability of markets" (McCauley) Published in: Physica A 329 (2003).

International Search Report and Written Opinion dated Aug. 4, 2008, issued in connection with PCT Application No. PCT/US08/57734 (11 pages).

Hoehn, William K., "Robust Design Through Design to Six Sigma Manufacturability," 1995 Engineering Management Conference, IEEE 1995, pp. 241-246.

Rummel, Jeffrey, "An empirical investigation of costs in batching decisions," Decision Sciences, vol. 31, No. 1, Winter 2000, pp. 79-103.

Darlington, Jon, "Lean thinking and mass customization: The relationship between product and costs," Management Accounting, vol. 77, No. 10, Nov. 1999, pp. 18-21.

Michael, George, "Lean Six Sigma: Combining Six Sigma Quality with Lean Speed," McGraw-Hill, Apr. 2002, ISBN: 0071385215.

Hines, Peter, Rich, Nick, "The seven value stream mapping tools," International Journal of Operations & Production Management, vol. 17, Issue 1, Nov. 1997.

Lee, Hau L., Tang, Christopher S., "Modeling the Costs and Benefits of Delayed Product Differentiation," Management Science, vol. 43, Issue 1, Jan. 1997, pp. 40-53.

Yang, Jiaqin, Deane, Richard H., "A lotsize reduction model for just-in-time manufacturing systems," Integrated Manufacturing Systems, 2002, vol. 13, Issue 7, pp. 471-488.

Bao, Han P., Samarch, J.A., "Affordable Design: A methodology to implement process-based manufacturing cost models into the traditional performance-focused multidisciplinary design optimization," American Institute of Aeronautics and Astronautics, pp. 1-7.

Herrmann, Jeffrey, Chincholkar, Mandar M., "Design for Production: A tool for reducing manufacturing cycle time," Proceedings of DETC 2000, 2000 ASME Design Engineering Technical Conference, Baltimore Maryland, pp. 1-10.

Caramanis, Michael C., Anli, Osman M., "Dynamic Lead Time Modeling for JIT Production Planning," Proceedings of the 1999 IEEE International Conference on Robotics 7 Automation, Detroit Michigan 1999, pp. 1450-1455.

Caramanis, Michael C., Pan, Haidong, Anli, Osman M., "A Closed-Loop Approach to Efficient and Stable Supply-Chain Coordination in Complex Stochastic Manufacturing Systems," Proceedings of the American Control Conference, Arlington VA 2001, pp. 1381-1388.

Herrmann, Jeffrey W., Chincholkar, Mandar M., "Reducing Throughput Time during Product Design Institute for Systems Research," University of Maryland, Aug. 13, 2001, pp. 1-25.

Nahmias, Steven, Production and Operations Analysis, © 2005, 2 pp., McGraw-Hill Irwin, NY, NY. 5th Edition, pp. 202-203.

Chase, Richard B., et al., Production and Operations Management, Manufacturing and Services, Eighth Edition, © 1998, pp. 590-591, Irwin McGraw-Hill, United States of America.

Roundy, Robin, "A 98% Effective Lot-Sizing Rule for a Multi-Product, Multi-Stage Production/Inventory Sys," Mathematics of Operations Research, Nov. 1986, pp. 699-727, vol. 11, No. 4. The Institute of Management Sciences/Operations Research Society of America, U.S.A.

Roundy, Robin, "98% Effective Integer-Ratio Lot-Sizing for One-Warehouse Multi-Retailer Systems," Management Science, Nov. 1985, pp. 1416-1430, vol. 31, No. 11, U.S.A.

Anupindi, Ravi, et al., Managing Business Process Flows, Principles of Operations Management, © 2006, 1999, Pearson Education, Inc. Upper Saddle River, NJ, p. 50.

Naylor et al., "The Manufacturing Game: A Formal Approach to Manufacturing Software," IEEE Transactions on Systems, Man and Cybernetics, pp. 321-334 (May/Jun. 1986).

Poole, T.G., and Szymankiewicz, J.Z., eds., Using Simulation to Solve Problems, Chapter 5, Building a Formal Model, pp. 75-112, 1977, McGraw-Hill Book Company (UK) Limited.

Dobson, G., et al., 'Batching to Minimize Flow times on One Machine,' Management Science, Jun. 1987, vol. 33, No. 6, pp. 784-799.

Kochan, A., 'Hocus Takes the Risk Out of Planning FMS,' FMS Magazine, pp. 91-93, Apr. 1984.

Queueing Networks and Markov Chains: Modeling and Performance Evaluation with Computer Science Applications, Bolch, Greiner, de Meer, and Trivedi, eds., John Wiley & Sons, Inc., 1988, pp. 209, 212-215, 223-225, 265-273, 283-288, 430-438, 630-641.

\* cited by examiner

PREDICTIVE COST REDUCTION BASED ON A THERMODYNAMIC MODEL

CROSS-REFERENCE TO RELATED APPLICATIONS

This application claims the benefit of U.S. Provisional Application Ser. No. 60/919,105, filed on Mar. 20, 2007, and the benefit of U.S. Provisional Application Ser. No. 60/919,289, filed on Mar. 21, 2007, both of which are incorporated by reference in their entirety.

TECHNICAL FIELD

This description generally relates to predicting cost reduction based on process improvement.

BACKGROUND

Within processes there are costs resulting from inefficiencies and waste. Investing in process improvement may reduce the costs and increase growth. However, a qualitative, predictive measure of the growth resulting from a reduction in costs is generally not available.

SUMMARY

According to one general implementation, a predictive measure of the growth resulting from a reduction in costs is provided by applying empirically determined economic data to a thermodynamic model.

In another general implementation, a cost reduction system includes a thermodynamic model configured to determine a predictive cost reduction for a process, the predictive cost reduction being derived from thermodynamic principles, a processor, and an output module. The processor is configured to access parameters associated with a process, the parameters including a quantity of units of work-in-process at first and second times, and first and second constants respectively indicative of growth between the first and second times, and of a translated reduction of the work-in-process to a reduction of cost. The processor is further configured to apply the thermodynamic model to the accessed parameters, and determine a predictive cost reduction associated with an improvement of the process. The output module is configured to output the determined predictive cost reduction.

In another general implementation, parameters associated with a process are accessed. The parameters include a quantity of units of work-in-process (WIP) at first and second times, and first and second constants respectively indicative of growth between the first and second times, and of a translated reduction of the WIP to a reduction of cost. A thermodynamic model is applied to the accessed parameters, and a predictive cost reduction associated with an improvement of the process based on applying the thermodynamic model is output.

Implementations may include one or more of the following features. The thermodynamic model may be derived from Carnot's equation. Little's Law may be used to derive an expression that is analogous to Carnot's equation. The thermodynamic model derived from Carnot's equation may include an expression analogous to Carnot's equation, the expression being derived from Little's Law. The first constant indicative of growth may include a ratio of an economic value at the second time and the economic value at the first time. The economic value at the second time may represent demand at the second time, and the economic value at the first time may represent demand at the first time. The economic value at the second time may represent revenue at the second time, and the economic value at the first time may represent revenue at the first time.

In some implementations, applying the thermodynamic model may include determining the predictive cost reduction using:

$$\text{Predictive Cost Reduction} = 1 + R_e \log_2\left(\frac{\alpha_R W_f}{W_i}\right) \quad (1)$$

In Equation (1), $R_e$ represents the second constant, $W_f$ represents the quantity of units of the WIP at the second time, $W_i$ represents the quantity of units of the WIP at the first time, and $\alpha_R$ represents a ratio of the growth at the first time to the value of the growth at the second time. The second constant may have a value between 0.09 and 0.11. The first and second constants may be determined based on empirical data.

In some implementations, the process may include value-added costs and non-value added costs, and the non-value added costs may include 50% or more of a total cost associated with the process. The non-value added costs may include rework of at least one of the units of WIP, and the rework may include performing the at least one of the units of WIP more than one time. The total cost associated with the process may be driven by the rework. The cost reduction may be proportional to the logarithm of a reduction in the quantity of units of WIP from the first time to the second time. In other implementations, the process may be modified based on the predictive cost reduction.

In another general aspect, a predictive cost reduction associated with improvement of a process is output, the predictive cost reduction being based on applying a thermodynamic model to an accessed quantity of units of WIP at various times, and constants indicative of growth between the various times, and of a translated reduction of WIP to reduction of cost.

Implementations may include one or more of the following features. The constants indicative of growth may include a ratio of an economic value at one of the various times and the economic value at another of the various times. The economic value may represent demand. The economic value may represent revenue. Applying the thermodynamic model may include determining the predictive cost reduction using Equation (1).

In another general aspect, a computer program product is tangibly embodied in a machine-readable medium, and the computer program product includes instructions that, when read by a machine, operate to cause a data processing apparatus to access parameters associated with a process. The parameters include a quantity of units of WIP at first and second times, and first and second constants respectively indicative of growth between the first and second times, and of a translated reduction of the WIP to a reduction of cost. A thermodynamic model is applied to the accessed parameters, and a predictive cost reduction associated with an improvement of the process output based on applying the thermodynamic model is output.

Implementations may include one or more of the following features. The thermodynamic model is derived from Carnot's equation. Applying the thermodynamic model may also include determining the predictive cost reduction using Equation (1).

Implementations of any of the techniques described above may include a method or process, a system, or instructions stored on a computer-readable storage device. The details of particular implementations are set forth in the accompanying drawings and description below. Other features will be apparent from the following description, including the drawings, and the claims.

DETAILED DESCRIPTION

Figure 1A:
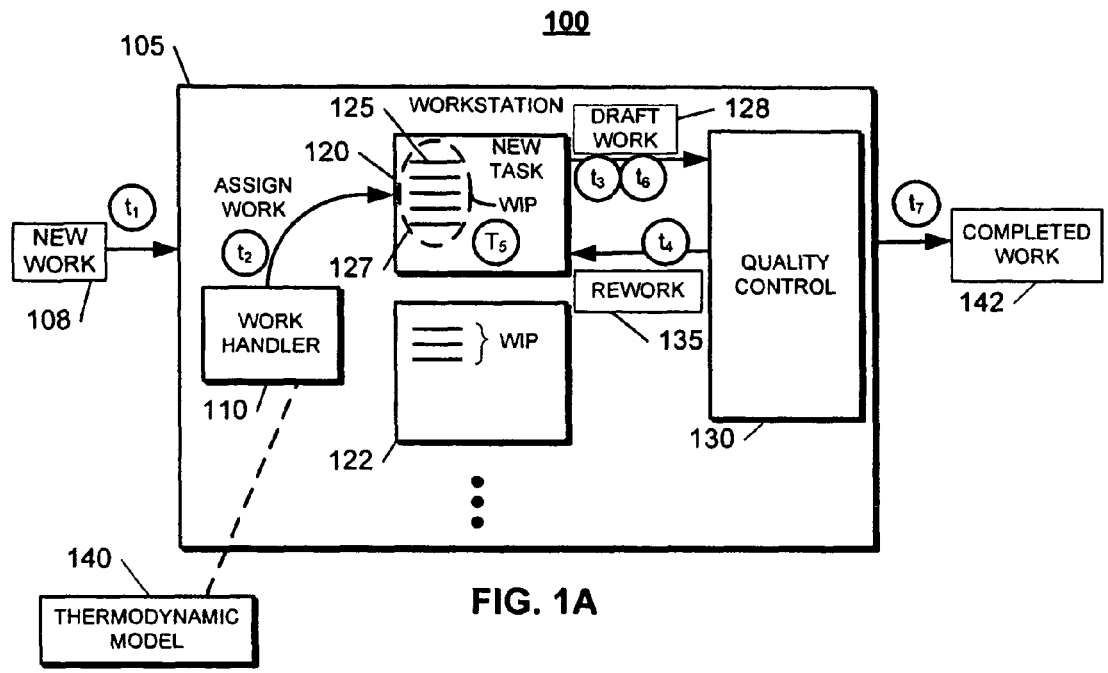
FIG. 1 is a contextual diagram of an exemplary system.

According to one general implementation, a predictive measure of the growth resulting from a reduction in costs is provided by applying empirically determined economic data to a thermodynamic model. Specifically, a predictive cost reduction associated with improvement of a process is output, the predictive cost reduction being based on applying a thermodynamic model to an accessed quantity of units of WIP at various times, and constants indicative of growth between the various times, and of a translated reduction of WIP to reduction of cost.

FIG. 1 illustrates an exemplary system 100 in states before and after a thermodynamic model is applied to provide a predictive measure of growth resulting from a reduction in costs. Specifically, the system 100 includes a process 105 (such as a business process), that may be analyzed for improvement by a thermodynamic model 140. A predictive cost reduction achieved from contemplated process improvements may be determined based on applying a thermodynamic model to parameters associated with the process 105. In particular, and as discussed in greater detail below, the thermodynamic model 140 analogizes waste in the process 105 to entropy in a thermodynamic process in order to determine a predicted reduction in cost associated with the process 105 as a result of an investment in improvement of the process 105. The thermodynamic model 140 may be derived from Carnot's equation. In some implementations, and as shown below in Equation (22), Little's Law may be used to derive a thermodynamic model of the process 105 that is analogous to Carnot's equation. The time for an item to transit the process 105 may be referred to as the lead time, and the lead time is a primary driver of the costs associated with the process 105. The time for an item to transit completely through the process 105 may be analogized to a velocity of the process 105. Increasing the velocity of the process 105 leads to a reduced lead time and a reduction in costs associated with the process 105. As shown below, Little's Law may be used to determine a measure of process improvement corresponding to increasing the velocity of the process 105 by a particular amount.

The process 105 may be any type of process implemented by, for example, an enterprise, an organization, or group of enterprises and/or organizations. The process 105 also may be referred to as a microeconomic process. As discussed in more detail below, the process 105 is associated with a cost related to the amount of waste and inefficiency in the process 105. Modifications may be made to the process 105 to improve the process 105 and reduce the cost associated with the process 105 by, for example, reducing the waste and inefficiencies in the process 105. However, making such modifications entails making an investment in the process 105, particularly an investment in improving the process 105. Thus, predicting a quantitative measure of cost reductions that result from investing in the process 105 may allow for more rational investment in process improvement as compared to techniques in which a quantitative measure of cost reduction is not available prior to making an investment in process improvement.

A decision to improve a process of an enterprise without a predictive measure of the reduction in cost achievable as a result of the process improvement may rest on judgment or anecdotal evidence. For example, a consultant to the enterprise may, without the benefit of a predictive cost reduction, estimate a savings of 3% based on process improvements, when in fact the process improvements would result in a savings of 8%. Had the enterprise known that a savings of 8% was possible, the enterprise may have been more willing to invest in the process improvements. In another example, a process improvement that appears to have the potential to greatly reduce costs actually may not result in a reduction of costs. In this example, a quantitative predictive cost reduction may save the enterprise from investing in unprofitable process improvements.

The process 105 may be any type of process. For example, the process 105 may implemented by an enterprise. The enterprise may be an organization formed to achieve a common commercial or social goal. For example, the enterprise may be an organization that oversees, arranges and/or engages in manufacturing. For example, the process 105 may be a manufacturing process implemented by an enterprise that engages in the manufacture and sale of automobiles. In some examples, the enterprise may be an organization that participates in transactional engagements with other enterprises or within the enterprise itself. For example, the enterprise may be an insurance company and the process 105 may be implemented to receive and process insurance claims. In another example, the enterprise may be a law firm, and the process 105 may represent a workflow that occurs when the law firm accepts a new legal case and the law firm processes the case to completion. In yet another example, the process 105 may be a process to develop proposed designs for automobiles implemented by an enterprise involved in product development. In some examples, the process 105 may include aspects of both manufacturing and transactional processes.

The process 105 is associated with a cost related to the amount of waste in the process 105. As discussed in more detail below, the cost of the process 105 may be analogized to entropy in a thermodynamic process, and the costs of the process 105 may be primarily driven by WIP. WIP may be the number of units of work that are in the process 105 at a particular time. In other words, WIP may be considered to be the number of units of work that are in various stages of completion within the process 105. In some examples, WIP may be a number of tasks that are in various stages of completion within the process 105.

For example, the process 105 may be an process to manufacture automobiles. In this example, a unit of work may be any action item related to manufacturing automobiles, such as attaching doors to an automobile frame. If the doors are attached at a particular workstation, and there are fifteen automobile frames at the workstation waiting for doors to be attached, the WIP has a value of fifteen. In another example, the process 105 may be a transactional process, such as a process to process documents related to a legal case handled by a law firm. In this example WIP may be the number of tasks in progress in the process 105. In this example, the process 105 may include a task to create binders to hold the papers and a task to scan physical documents into an electronic system. The WIP associated with the process 105 may include of variety of different items, each of which may have a different completion time. However, as discussed in more detail below, the lead time of the process 105 is governed by the average completion rate of the different items.

Although WIP is a primary driver of costs in the process 105, costs in the process 105 also may result from obsolescence (e.g., items made in the process 105 or tasks performed as part of the process 105 are no longer needed by a customer), flaws within the process 105 that cause items made in the process 105 to be defective or unusable, and indirect costs (e.g, overhead costs stemming from administering the process, costs of equipment and facilities, and research and development costs).

In greater detail, in the example shown in FIG. 1A, the system 100 includes the process 105, a new work item 108, a work handler 110, workstations 120 and 122, a quality control module 130, and a completed work item 142. The new work item 108 enters the process 105 at a time $t_1$. The new work item 108 may be, for example, an order, or other indication, that the system 100 is to process the new work item 108 into the completed work item 142. For example, the process 105 may be an automobile manufacturing process, and the new work item 108 may be an order for an automobile.

The work handler 110 acts as a gatekeeper and assigns the new work item 108 to the workstation 120 at time $t_1$. In some implementations, the work handler 110 may include a controller with process monitoring capabilities that monitors the process 105. In these implementations, the work handler 110 may determine to which of multiple workstations to assign the new work item 108 based on the capabilities of the workstations or a current workload of the workstations. In some implementations, the work handler 110 may assign the new work item 108 through an automated process. In some implementations, the work handler 110 may assign the new work item 108 manually and with human intervention. In the example shown, the work handler 110 assigns the new work item 108 to the workstation 120.

In the example shown, the system 100 includes the workstation 120 and the workstation 122. The workstations 120 and 122 are points in the process 105 that process units of work or perform one or more tasks. The workstations 120 and 122 receive a new task or a new unit of work 125 and process the task or unit of work 125 to produce a draft work item 128. Thus, the workstations 120 and 122 transform the new work item 108 partially or completely into the completed work item 142. Although two workstations are shown in the example of FIG. 1A, in other examples, more or fewer than two workstations may be included. In some examples, the workstations 120 and 122 may perform different actions as compared to each other. In some implementations, the workstations 120 and 122 may each perform more than one task or type of unit of work. The workstations 120 and 122 may include machines, automated processes running on machines, or partially automated processes that includes human interaction by, for example, a workstation operator. For example, the process 105 may be a process to manufacture automobiles, and the workstations 120 and 122 may each be stations that attach doors to automobile frames. In some examples, the process 105 may be a process to process insurance claims and the workstations 120 and 122 represent claims adjusters.

The workstation 120 includes existing WIP 127 that is waiting to be processed by the workstation 120. Such WIP may be considered to be, for example, a backlog of work units or tasks that have accumulated at a particular workstation. In the example shown in FIG. 1A, the existing WIP 127 waits to be processed by the workstation 120. The new work item 108 is assigned to the workstation 120, and, as a result, a new task or unit of work 125 is added to the existing WIP 127. As discussed above, the workstation 120 may be considered as a processing point within the process 105 that transforms the new work item 108, partially or completely, into a completed work item 142. For example, the process 105 may be a process to manufacture a welded workpeice, and the workstation 120 may be a welding station, the new task 125 may be a part to be welded to partially complete the workpeice, and the WIP 127 may include other parts to be welded. Additionally, new work may be entering the system 100 at any point in the process, assigned to a workstation 120 by the work handler 110, and added to the existing WIP 127.

A quality control module 130 reviews the draft work item 128 and determines if the draft work 128 is satisfactory. If the draft work 128 is satisfactory, the draft work 128 becomes the completed work item 142. However, if the draft work 128 is not satisfactory, rework is needed, and the task is returned to the workstation 120 as rework 135 at time $t_4$. The rework 135 is added to the WIP 127 at time $t_5$ and processed by the workstation 120 into processed rework 137 (not shown). In some implementations, the rework 135 may be assigned to a workstation other than the workstation that produced the draft work item 128.

At time $t_6$, the processed rework 137 is reviewed by the quality control module 130. At time $t_7$, the processed rework 137 that has been checked by the quality control module 130 exits the system 100 as the completed work item 142.

Thus, the rework 135 causes a delay in the transition of the new work item 108 into the completed work item 142. In particular, without rework the transition from the new work item 108 to the completed work item 142 occurs shortly after time $t_3$. However, in examples in which the quality control module 130 determines rework is needed, the new work item 108 transitions to the completed work item 142 at time $t_7$. In some examples, more that one cycle of rework occurs, thus the transition from the new work item 108 to the completed work item 142 may occur at a time later that time $t_7$. Accordingly, as rework does not add features to the completed work item 142 beyond what was originally intended for the completed work item 142, rework adds a non-value-added cost to the process 105. Other non-value-added costs include costs resulting from items that are unusable or defective to the point that the items cannot be made satisfactory through rework. The total cost of the process includes value-added costs, such as research and development costs, in addition to non-value added costs.

Thus, rework may increase the total cost associated with the process 105. For example, in a particularly inefficient process, non-value added costs, such as rework, may account for 50% or more of a total cost associated with a process.

A thermodynamic model 140 may be used to monitor the process 105 such that a predictive cost reduction resulting from improvements to the process 105 may be determined. In particular, the process improvements may be designed to reduce the time for the new work item 108 to transition to the completed work item 142. As shown in the example of FIG. 1A, the thermodynamic model 140 may monitor the process 105 to, for example, collect data associated with the process in order to determine a predictive cost reduction associated with an improvement in the process 105. For example, the thermodynamic model 140 may access parameters in the work handler 105 to determine which workstations are receiving the highest number of units of work. In another example, the thermodynamic model 140 may access parameters in the quality control module 130 to determine the duration of time between a new work item entering the process 105 and the corresponding completed work item leaving the process 105.

Figure 1B:
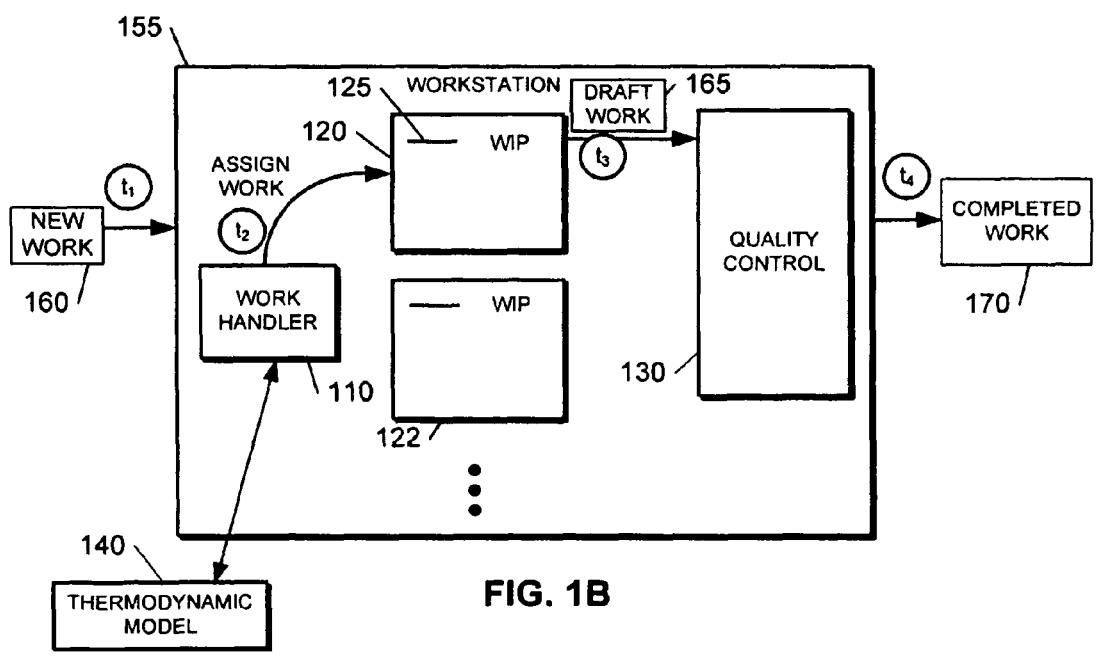

Referring to FIG. 1B, an illustration the system 100 including a modified process 155 that incorporates feedback from the thermodynamic model 140 is shown. In this example, the modified process 155 is an improved version of the process 105 discussed above. In the modified process, a new work item 160 enters the modified process 155 at time $t_1$. The work handler 110 assigns the new work item 160 to the workstation 120. The assignment of the new work item 160 to the workstation 120 may be based on feedback from the thermodynamic model 140. For example, the thermodynamic model may provide the work handler 110 with data to improve process efficiency, by for example, assigning the new work item 160 to a workstation with no WIP. The workstation 120 processes the new work item 160 into a draft work item 165 at time $t_3$, and the draft work item 165 is checked by the quality control module 130. At time $t_4$, a completed work item 170 exits the system 100.

Figure 2:
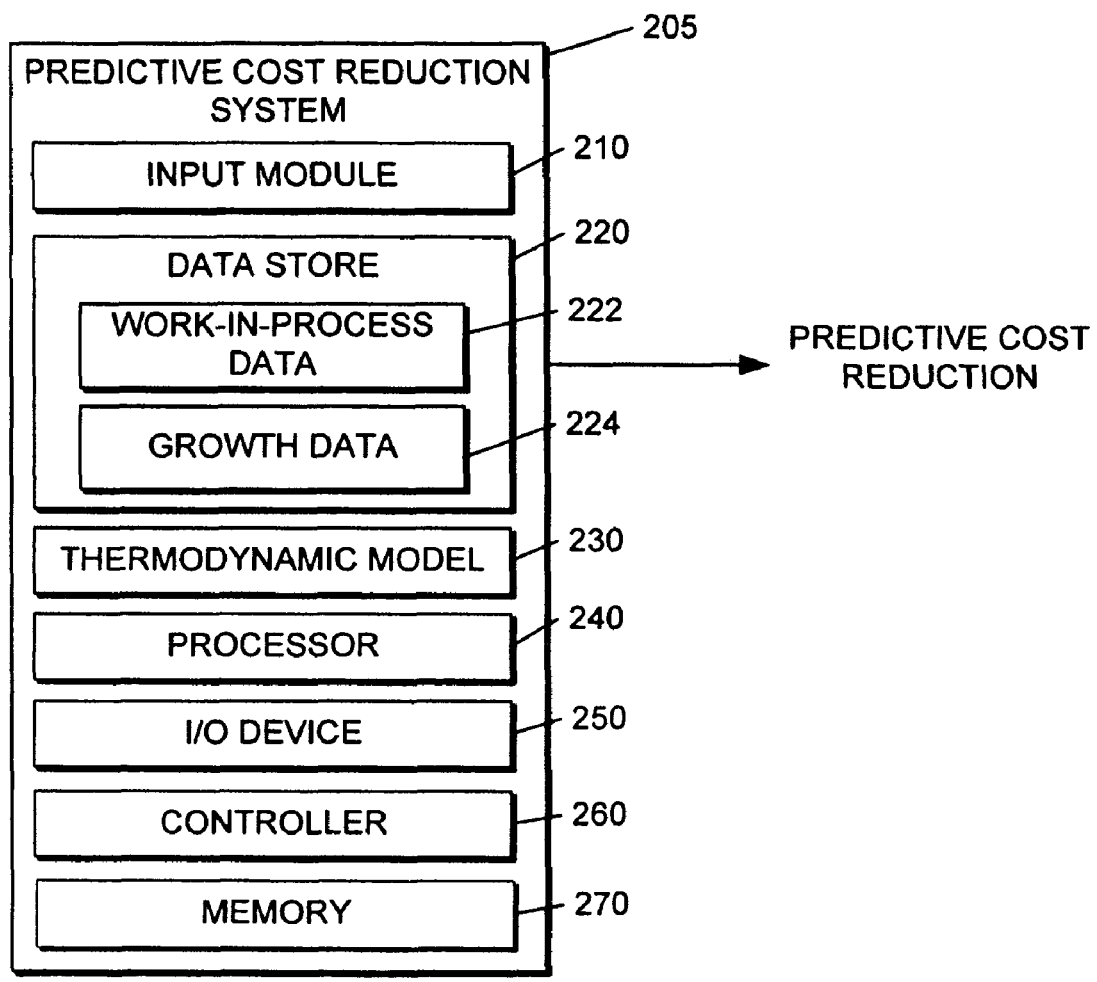
FIG. 2 is a block diagram of an exemplary system.

Referring to FIG. 2, a block diagram of a system 200 that includes a predictive cost reduction system 205 is shown. The system 200 includes an input module 210, a data store 220, a thermodynamic model 230, a processor 240, an I/O device 250, a controller 260, and a memory 270. The predictive cost reduction system 200 may be used to determine a predictive cost reduction associated with an improvement in a process (such as the process 105 discussed above with respect to FIG. 1A) The predictive cost reduction system 200 may be implemented within hardware or software.

The input module 210 imports data associated with a process. The data may include a quantity of units of WIP at various times and locations in the process. For example, the input module 210 may receive data that includes a measure of the amount of WIP in the process at a first time and a measure of the amount of WIP in the same process at a second time. The data also may include data acquired from outside of the process, such as an empirically determined constant that relates a reduction in the amount of WIP between two times to a reduction in the costs associated with the process. In some implementations, the input module 210 receives data from a source external to the system 205. In some implementations, the input module 210 receives data from a source within the system 200. In some implementations, the input module 210 accesses data, either from within the system 205 or from a source external to the system 205. In some implementations, the input module 210 reformats and/or transforms the data such that the data may be processed and stored by other components within the system 205.

The predictive cost reduction system 200 also includes a data store 220. In some implementations, data from the input module 210 is stored in the data store 220. The data store 220 may be, for example, a relational database that logically organizes data into a series of database tables. The data included in the data store 220 may be, for example, data associated with a process such as the process 105 or the process 155. Each database table arranges data in a series of columns (where each column represents an attribute of the data stored in the database) and rows (where each row represents attribute values). The data store 220 may be, for example, an object-oriented database that logically or physically organizes data into a series of objects. Each object may be associated with a series of attribute values. The data store 220 also may be a type of database management system that is not necessarily a relational or object-oriented database. For example, a series of XML (Extensible Mark-up Language) files or documents may be used, where each XML file or document includes attributes and attribute values. Data included in the data store 250 may be identified by a unique identifier such that data related to a particular process may be retrieved from the data store 220.

The data store 220 includes WIP data 222 and growth data 224. The WIP data 222 includes a quantity of WIP for a process at a first and second time. The WIP data 222 also may include data related to a quantity of WIP at more than two times, and the WIP data 222 may include data related to a quantity of WIP for more than one process. The WIP data 222 may include a measure of all of the WIP in the process at a particular time, or all of the WIP in the process over a defined time period. As discussed above, the WIP in any process may include more than one type of work unit or more than one type of task. Thus, the WIP data 222 also may include data that represents the total WIP in the process. The WIP data 222 may include WIP for a particular part number, a particular type of work unit, or a particular task within a transactional process.

The growth data 224 includes data related to the growth of the process at the first and second time. For example, the growth data 224 may include revenue generated by the process at the first time and revenue generated by the process at the second time. In this example, the growth data 224 may be represented by data indicating a change in dollars of profit realized from the process as a result of process improvements.

The predictive cost reduction system 205 also includes the thermodynamic model 230. The thermodynamic model 230 may determine a predictive cost reduction based on an equations of cost reduction derived from thermodynamic principles, such as Equation (1). For example, reduction in lead time (e.g., the time from the injection of work into the process until the time at which the work is completed) as expressed by Little's Law leads to an expression for the reduction of waste in the process. In some implementations, the thermodynamic model 230 receives data indicative of growth between various times from the data store 220 and/or the growth data 224. In other implementations, the thermodynamic model 230 may access such data from the data store 220, the WIP data 222, or a source external to the predictive cost reduction system 205.

The thermodynamic model 230 receives data indicative of a quantity of WIP in the process at various times from the data store 220 and/or the WIP data 222. In other implementations, the thermodynamic model 230 may access such data from the data store 220, the WIP data 222, or a source external to the predictive cost reduction system 205. The components of the predictive cost reduction system 205 may translate or reformat data from the input module 210 into data suitable for the thermodynamic model 230. For example, growth data associated with the process at various times may be received from the input module 210 and used to determine constants indicative of growth including a ratio of economic value at one of the times to economic value at another of the various times. The economic value may represent demand or revenue.

The thermodynamic model 230 may be a specialized hardware or software module that is pre-programmed or pre-configured to invoke specialized or proprietary thermodynamic functionality only. In another aspect, the thermodynamic module 230 may be a more generic hardware or software module that is capable of implementing generic and specialized functionality, including thermodynamic functionality.

The predictive cost reduction system 205 also includes the processor 240. The processor 240 may be a processor suitable for the execution of a computer program such as a general or special purpose microprocessor, and any one or more processors of any kind of digital computer. Generally, a processor receives instructions and data from a read-only memory or a random access memory or both. The processor 240 receives instruction and data from the components of the predictive cost reduction system 205 to, for example, output a predictive cost reduction associated with improvement of a particular process. In some implementations, the predictive cost reduction system 205 includes more than one processor.

The predictive cost reduction system 205 also includes the I/O device 250, which is configured to allow a user selection. For example, the I/O device 250 may be a mouse, a keyboard, a stylus, or any other device that allows a user to input data into the predictive cost reduction system 205 or otherwise communicate with the predictive cost reduction system 205. In some implementations, the user may be a machine and the user input may be received from an automated process running on the machine. In other implementations, the user may be a person. The I/O device 250 also may include a device configured to output the predictive cost reduction associated with an improvement in one or more processes.

The predictive cost reduction system 205 also includes the controller 260. The controller 260 is an interface to a process such as the process 105 or the process 155. The controller 260 may receive feedback from the process, such as quantities of WIP and growth data associated with the process at various times. The controller 260 also may cause changes in the system in response to the feedback, such as, for example, actuating a control valve in a pipeline such that the pipeline is opened or shut to accommodate a higher or lower flow of material, respectively. In other examples, the controller 260 may turn a tool on or off, shut down or activate a system, or activate a user interface that affects a transactional process.

The predictive cost reduction system 205 also includes a memory 270. The memory 270 may be any type of machine-readable storage medium. The memory 270 may, for example, store the data included in the data store 220. In some implementations, the memory 270 may store instructions that, when executed, cause the thermodynamic model 230 to determine a predictive cost reduction associated with process improvement.

Although the example predictive cost reduction system 205 is shown as a single integrated component, one or more of the modules and applications included in the predictive cost reduction system 205 may be implemented separately from the system 205 but in communication with the system 205. For example, the data store 220 may be implemented on a centralized server that communicates and exchanges data with the predictive cost reduction system 205.

Figure 3:
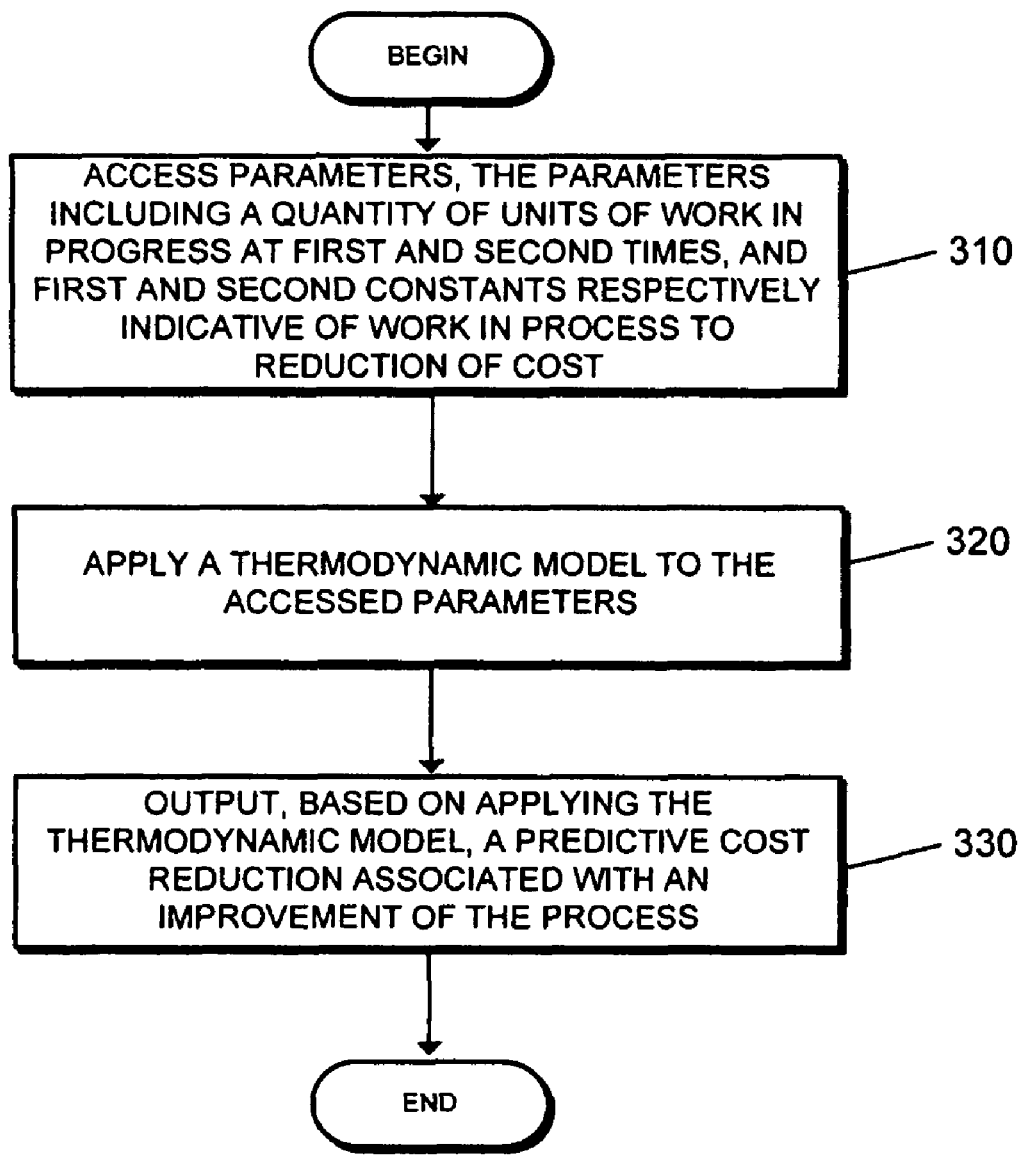
FIG. 3 is a flowchart of an exemplary process.

Referring to FIG. 3, an example process 300 is illustrated. The example process 300 outputs a predictive cost reduction associated with an improvement of a process. The process 300 may be performed by one or more processors included in a predictive cost reduction system 205 discussed above with respect to FIG. 2. The process may be a process such as the process 105 or the process 155 discussed above with respect to FIGS. 1A and 1B.

Parameters associated with a process are accessed (310). The parameters include a quantity of units of WIP at first and second times. For example, the first time may be a time before any process improvements are made to the process, and the second time may be a time after the process has been improved.

The accessed parameters also include a constant indicative of growth between the first and second times. Continuing the above example, the constant indicative of growth may be based on growth of an economic value at a first time before process improvement and a second time after process improvement. The first time may be referred to as an "initial time" and the second time may be referred to as a "final time." The constant indicative of growth may be, for example a ratio of an economic value at the second time and the economic value at the second time. For example, the economic value may be a ratio of revenue generated by the process before process improvement and revenue generated by the process after process improvement. Revenue may be represented as an amount of income produced by the process over a period of time. Thus, revenue at the first time may be income from the process over, for example, a week. Revenue at the second time may be income over a week from the process after process improvements have been implemented.

In some examples, the economic value may be demand. Although demand, which may be demand per unit, may provide more accuracy, data related to demand is oftentimes not maintained by the enterprise. Thus, revenue may be used as a surrogate for demand when demand data is not available. Revenue is a close approximation to unavailable demand data. Revenue data may be, for example, data that tracks revenue in dollars per unit of product produced by the process. Referring to Equation (1) shown above, the first constant may be represented by $\alpha_R$ in examples where the ratio is based on revenue. In examples in which the ratio is based on demand, such as the equations expressed below, the first constant may be represented by $\alpha_D$. In some examples, the constant indicative of growth between the first and second times may represent a change in the units produced by the process at the first time and the units produced by the process at the second time. The units produced by the process at the first time may be, for example, the units produced by the process prior to investing in and implementing process improvements, and the units produced by the process at the first time may represent the units produced by the process over a defined time period. For example, the units produced at the first time may represent the automobiles produced by an automobile manufacturing process in a month, and the units produced at the second time may represent the automobiles produced in a month the manufacturing process after process improvements have been implemented. In other examples, the constant indicative of growth between the first and second times may represent work items completed by a transactional process. Although in the examples above, the economic values are values determined over a week or a month, in other examples any time period that provides a consistent comparison of the process at the first time to the process at the second time may be used.

Figure 4:
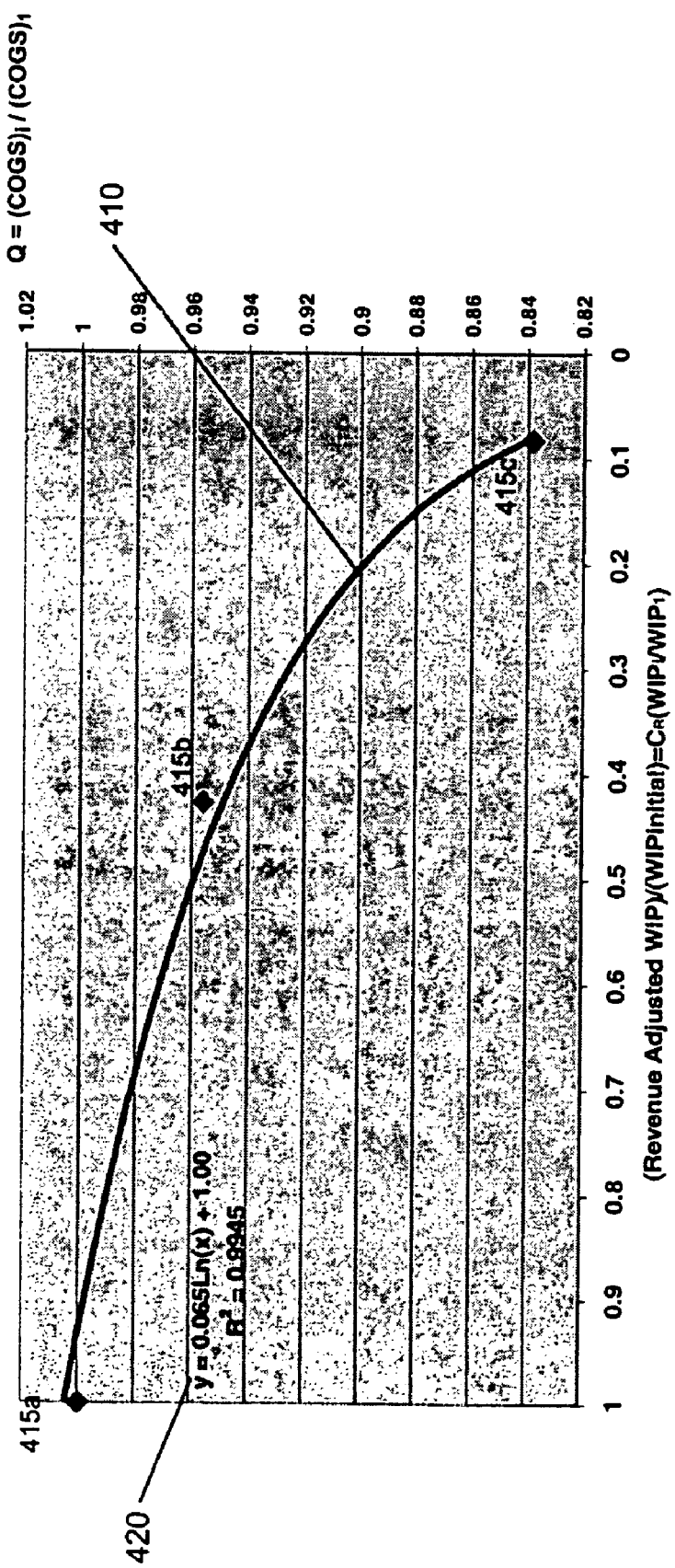
FIGS. 4 to 6 are graphs that illustrate exemplary example relationships between cost reduction versus reduction in WIP.
Figure 5:
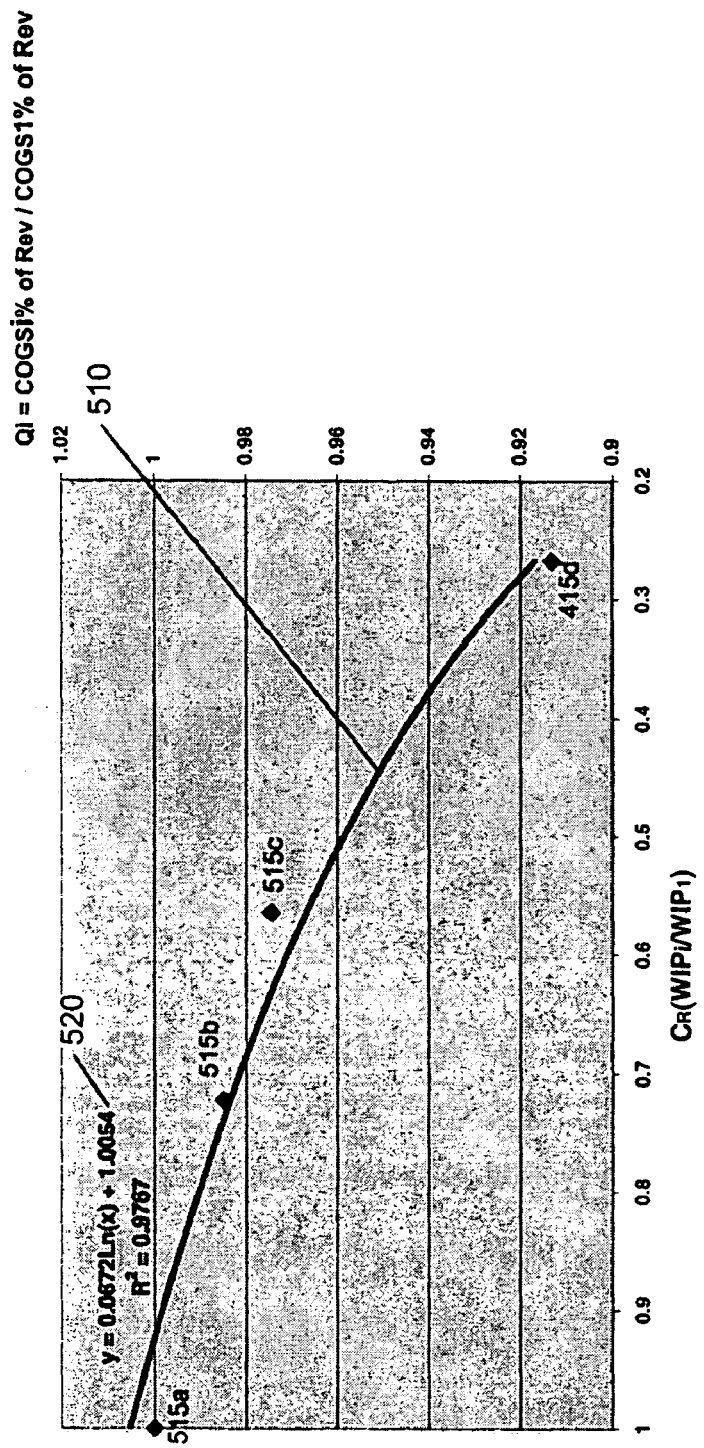
Figure 6:
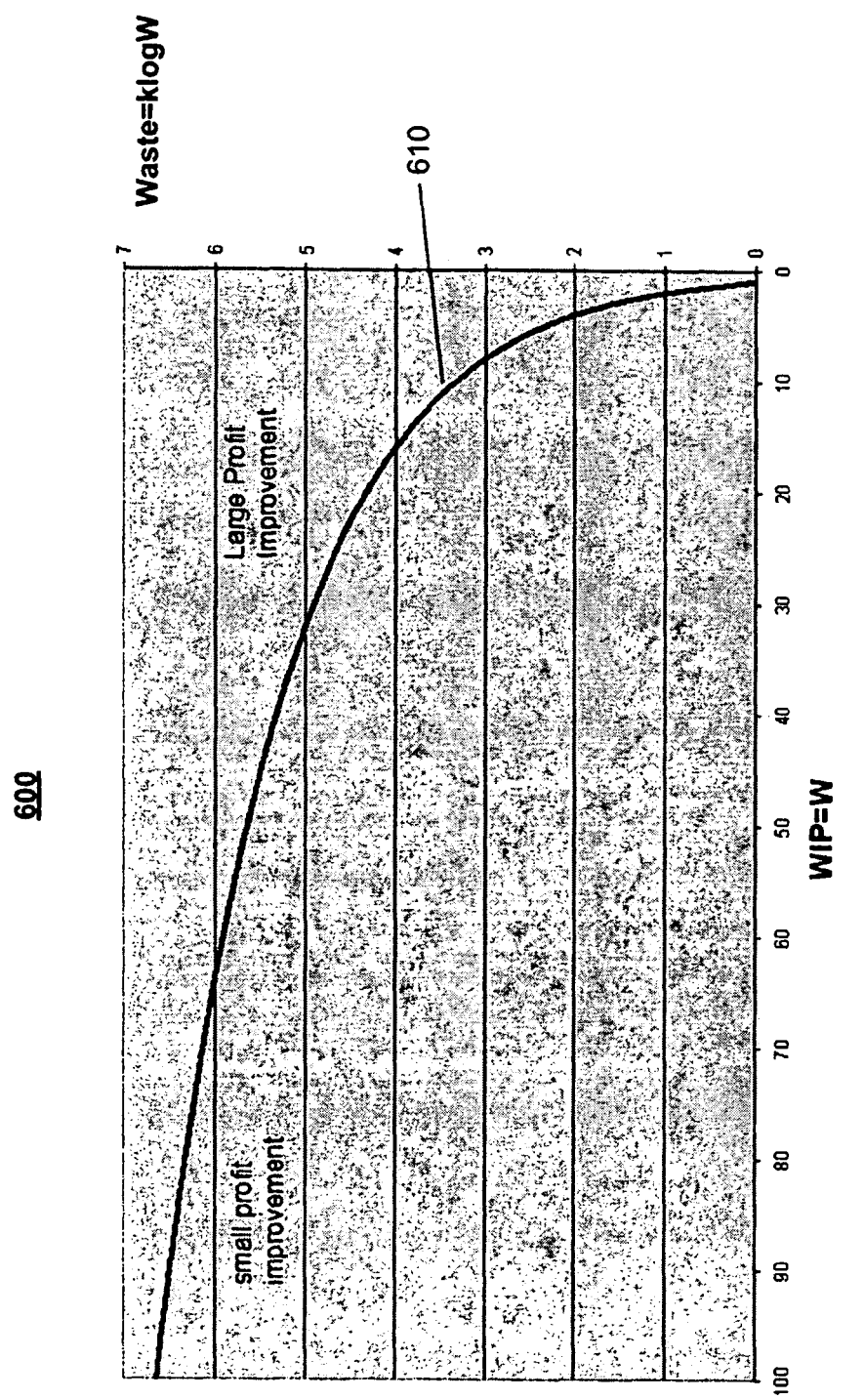

The accessed parameters also include a second constant indicative of a translated reduction of the WIP to a reduction in the cost of the process. The second constant relates a reduction in WIP in the process to a reduction in the costs associated with the process. The second constant may be referred to as a gas constant of economics. The second constant may be empirically determined. FIGS. 4-6 below show examples of data from which the second constant may be derived. In some examples, the second constant has a value between 0.09 and 0.11.

A thermodynamic model is applied to the accessed parameters (320). The thermodynamic model may be derived from Carnot's equation, and the thermodynamic model may include equations of cost reduction such as Equation (1).

A predictive cost reduction associated with an improvement of the process is output based on applying the thermodynamic model (330). In some implementations, the process may be modified based on the predictive cost reduction. For example, data maybe output by the controller 260 to modify the process.

The following provides an analytical discussion of determining a predictive cost reduction associated with an improvement of a process, such as the process 105 discussed above, as output by the thermodynamic model, such as the thermodynamic models 140 and 230 discussed above.

The application of process improvement using conventional tools such as Lean Six Sigma and Complexity reduction promises significant cost reduction in Microeconomic processes. However, to justify the investment in process improvement, it can be helpful to have an estimate of the cost reduction benefit. In a case study contained herein, a reduction of Cost of Goods Sold of 3% was projected, but in fact an 8% reduction was achieved. It had been empirically noted that the cost reduction was best correlated with the reduction of the logarithm of the reduction in WIP. Such an equation may be derived from first principles of Queuing Theory, Information Theory and Thermodynamics together with an understanding of process improvement. The results of each are shown below and process improvement is discussed.

The efficiency of the transformation of revenue to profit not only can drive the share value of corporations, but also the destiny of economies, nations, and the career opportunities available to their citizens. Many firms have been slow to apply the early versions of process improvement, and, in consequence, suffered loss of market share. If a CEO and senior management could project a cost reduction of greater than 8% based on process improvement, rather than the 3% estimate provided by the consultant, the CEO and senior management would more likely take immediate action.

The following is a discussion of the elimination of waste in an engine. As discussed in more detail below, the discussion of the elimination of waste in an engine provides the background for understanding waste elimination in a microeconomic process.

In each cycle, an engine receives heat energy, $Q_H$, from a hot combustion source at temperature, $T_H$. With each power stroke of a piston in the engine, the engine transforms part of the received heat energy into useful work to drive a shaft. The rest of the input energy is expelled as waste energy, $Q_C$, to the environment at a cold sink temperature of $T_C$=25° C. at which point the cycle is complete and the engine is ready to receive more heat energy. Entropy, S, is drawn from the hot source, and at least as much entropy as is drawn from the hot source is delivered to the cold temperature sink, as reflected in Equation (2):

$$\text{Entropy} = S = \frac{Q_H}{T_H} \leq \frac{Q_C}{T_C} \quad (2)$$

Thus, the minimum waste energy, $Q_C$, delivered to the cold temperature sink is reflected in Equation (3), below:

$$\text{Waste} = Q_C \geq T_C S \quad (3)$$

In Equations (2) and (3), temperature is expressed in the absolute scale where 0° C.=273° Kelvin. Minimum waste in an engine is proportional to the entropy that is output to the cold sink. The "greater than or equal to" sign is "greater than" in a real engine due to the process being irreversible, which creates additional waste. For example, when a gas expands through a nozzle virtually all the entropy created is irreversible. According to Equation (2) entropy falls as the temperature from the hot combustion source, $T_H$, increases. This discovery helped inform the development of engines, from atmospheric engines of the $18^{th}$ century, which operated at 3% efficiency and about 100° C., to modern gas turbines, which can operate at 40% efficiency and 3000° C. As discussed below, the entropy flows in a microeconomic process, such as the process 105 discussed above with respect to FIG. 1, may be analogies to the entropy flow in an engine. Deriving the entropy flows of a microeconomic process and the parameters related to entropy reduction can similarly inform the reduction of waste which is cost in a microeconomic process.

The expression for the entropy change of an ideal gas undergoing compression at a constant temperature can be derived and may be used to derive an equivalent expression for microeconomic entropy. Change in entropy is reflected in Equation (4), below:

$$\text{Change in Entropy} = \Delta S = \int \frac{dQ}{T} \quad (4)$$

From the first law of thermodynamics, and as reflected in Equation (5), below:

$$dQ = dU + pdV \quad (5)$$

In Equation (5), Q represents heat, T represents temperature, U represents internal energy, P represents pressure, and V represents volume. The substitution of Equation (5) into Equation (4) results in an expression reflected in Equation (6), below:

$$\Delta S = \int \frac{(dU + PdV)}{T} = \int \frac{(c_v dT + PdV)}{T} = \int \frac{PdV}{T} \quad (6)$$

In Equation (6), $c_v$ represents the specific heat. The rightmost expression represents an expression for isothermal processes, where dT=0, involving an ideal gas. The pressure and volume of an ideal gas are reflected as Equation (7), where n represents a number of moles, below:

$$PV = nRT \quad (7)$$

Substituting Equation (7) into Equation (5) results in the expression shown in Equation (8):

$$\Delta S = \int \frac{nRTdV}{VT} = nR \int_{V_{Initial}}^{V_{Final}} \frac{dV}{V} = nR\log(V_{Final}/V_{Initial}) \quad (8)$$

Similarly, the energy expended by an external force performing isothermal compression on an ideal gas, as reflected in Equation (9):

$$\text{Energy expended in compression} = \quad (9)$$
$$\int_{V_i}^{V_t} P(-dV) = -\int_{V_i}^{V_t} \frac{nRT}{V} dV = -nRT\log(V_f/V_i) = -T\Delta S$$

Accordingly, the minimum waste in an engine is proportional to the entropy delivered to the cold sink times the cold sink temperature. Whether comparable entropy exists in a microeconomic process may be determined, and an equation representing such a comparable entropy can similarly inform the reduction of waste cost in the microeconomic process.

By way of example, if an enterprise has W units of WIP inventory and ships products that include C units of WIP inventory per year, then the company turns inventory Z according to Z=C/W times per year. Each turn of inventory may be analogized to a power stroke (or cycle) of an engine. $W_R$ units of revenue are drawn in to the process at revenue per unit r and processed by the process. $W_C$ units of equivalent cost are expelled from the process at dollars of cost per unit, which may be represented as c. For example, in a microeconomic process, to produce $W_R$ units of revenue may require more than $W_C$ equivalent units of cost due to scrap, rework, and obsolescence. Total cost c is the average total dollars of cost per unit including indirect expenses such as, for example, administrative and general expenses, research and development expenditures, and costs associated with acquiring and maintaining capital (e.g., machinery, information technology equipment, plants and manufacturing facilities, and office space). Profit is the difference between revenue and total cost. The input revenue per turn is $\$R_t=rW_R$. Likewise, a business can expel cost per inventory turn of $\$C_t=cW_C$. If $R and $C are analogous to energy and that $r and $c are analogous to temperature, ratios can be formed similar to Equation (2), as reflected in Equation (10):

$$\frac{Q_H}{T_H} \to \frac{R_t}{r} = \frac{rW_R}{r} = W_R \le W_C = \frac{cW_C}{c} = \frac{C_1}{c} \to \frac{Q_C}{T_C} \qquad (10)$$

In Equation (10), $R_t$ (which also may be expressed as $rW_R$) dollars of revenue flow into the microeconomic process from the market (e.g., customers and clients), and at least $C_t$ (which also may be expressed as $cW_C$) dollars of waste flow out of the microeconomic process. The difference between dollars of revenue flowing in and dollars of waste following out, $R_t-C_t$, can flow to the shareholders on each inventory turn as dollars of profit. Again, by analogy to an engine, energy flows from the hot source to the engine, waste heat is delivered to the cold sink, and the difference is useful work. Most of the entropy of WIP is irreversible, similar to that due to the free expansion of a gas. Thus, the entropy of a microeconomic process can be a function of units of WIP, W.

Waste may be defined as any cost that does not add a form, feature or function of value to the customer. Such costs also may be referred to as non-value added costs. Reduction in waste in labor and overhead costs through process improvement generally results in shorter lead time (e.g., the time for a new item entering the microeconomic process to transition into a completed work item ready for the customer). The lead time also may be referred to as the cycle time. Such reductions in waste in labor and overhead costs may be achieved through conventional techniques such as Lean Six Sigma, Complexity Reduction, and Fast Innovation. Shorter lead time may result in lower total cost. Reduction in total cost resulting from shorter lead time is observed in both transactional (non-manufacturing) microeconomic processes such as, for example, product development, marketing, planning, and budgeting and in manufacturing microeconomic processes.

Because the lead time of a process may be found empirically to drive process cost, analysis of the contributors to lead time leads to insight into the process cost. The average lead time of a process is governed by Little's Law. The lead time, per cycle of production, from injection of work into a process to that work's completion is reflected in Equation (11):

$$\text{Lead Time of any Process} = \qquad (11)$$
$$\frac{\text{Number of Units of Work In Process}}{\text{Average Completion Rate}} = \frac{W}{D} = \tau = \text{time/cycle}$$

As an example of Little's Law, if a process has WIP (WIP) of fifty units and has an average completion rate of two units per hour, then the average time for a unit of WIP to transit the process is reflected in Equation (12):

$$\text{Lead Time of Process} = \frac{50 \text{ units}}{2 \text{ units/hour}} = 25 \text{ hours} \qquad (12)$$

Thus, in the above example, a manufacturing cycle is completed every twenty-five hours. In a transactional process, the average completion rate can be measured in number of tasks completed per unit time. The average completion rate, D, in Equation (11) is, on average, equal to the customer demand rate, and hence is exogenous to the process. The WIP in Little's Law is a dimensionless numerical quantity. For example, WIP may be the number of units, rather than dollars of cost or revenue associated with each of the units. Although the WIP may include a variety of different items having different completion rates, the average completion rate D governs the lead time of the process. Moreover, Little's Law is distribution independent. Thus, regardless of whether task completion times follow a Gaussian distribution as in manufacturing, a Rayleigh distribution as in product development, or whether arrivals/departures are Poisson can be irrelevant to lead time.

To discover if entropy exists in microeconomic processes, a derivation of Equation (9) can be followed. Little's Law can be transformed into a velocity equation by inversion as reflected in Equation (13):

$$\begin{aligned} \text{Process Velocity} &= v \qquad (13)\\ &= \frac{\text{Average Completion Rate}}{\text{No. of Units of Work In Process}}\\ &= \frac{1}{\tau}\\ &= \frac{D}{W} \text{ cycles/unit time} \end{aligned}$$

This velocity represents the number of manufacturing cycles completed per unit time, or in the case of product development the number of design cycles per unit time. The velocity is inversely proportional to the WIP, W, and directly proportional to the average completion rate, D. A pull system can be established such that not only the average completion rate, but also the instantaneous completion rate is equal to the market demand. As noted above, the average completion rate, D, is a constant exogenous variable driven by the market during periods comparable to the lead time.

As a first approximation, it can be assumed that the average completion rate, D, is constant. However, in some implementations, a variable average completion rate, for example, may not affect the derivation of the equation of projected cost reduction. The rate at which the velocity of a process in Equation (13) is accelerated is related to the rate at which WIP, W, can be reduced, assuming that the average completion rate, D, is constant. Thus, the decrease in WIP over a unit time, which may be expressed as $-dW/dt$, is a factor in the force shortening the process lead time, e.g., accelerating the velocity of the WIP. Taking the first derivative of Equation (13) as reflected in Equation (14):

$$\text{Process Acceleration} = a \quad (14)$$
$$= \frac{dv}{dt}$$
$$= -\frac{D}{W^2}\frac{dW}{dt} \text{ cycles/hour/hour}$$

Equation (14) is the acceleration of the velocity with which the WIP completes a cycle of production. The role of the factors in Equation (14) is discussed in the following. A reduction of WIP can accelerate the process, hence this factor can be related to an external force applied by process improvement which reduces WIP while maintaining D constant, hence accelerating the process velocity expressed in Equation (13).

The term "inertia" generally means "the innate force possessed by an object which resists changes in motion." The greater the inertial mass, the less will a body accelerate under a given external force such as –dW/dt. According to Equation (14), it can be concluded that, for a given magnitude of force –dW/Dt, the larger the $W^2$, the smaller the acceleration of the process. In statistics, the Probability Mass Function has the characteristics of Mass. $W^2$ may be associated as having the characteristics of the inertial mass of the process. One might intuitively expect the inertial mass of a process to be directly proportional to W. However, each unit of WIP can advance through the process on average if all units of WIP ahead of the unit of WIP also advance, as well as all those units of WIP behind the unit of WIP. Thus, each unit of WIP is, on average, coupled to all the other units of WIP in the process through Little's Law. This coupling is analogous to an inductor, in which each turn is coupled to all the other turns in the inductor, leading to self inductance proportional to the square of the number of turns rather than directly with the number of turns. WIP W is a dimensionless number, as is the inertial mass of a process, $W^2$.

However, unlike the dynamics of particles, the acceleration of WIP is determined, not by its mass in kilograms, but by the total number of units of WIP in the process. Because the inertial mass of a mechanical body is measured in kilograms, the word "mass" cannot be used in its technical sense to describe a process. Therefore, a distinction may be made between mechanical inertial mass and process inertial mass, and the term "Prinertia" may refer to process inertia, or process inertial mass, as expressed in Equation (15):

$$\text{Process Inertia=Prinertia}=W^2=M_M=\text{Mass}_{Microeconomic} \quad (15)$$

In Equation (15), a microeconomic analogy can be denoted by the subscript M.

Thus, $W^2$ may be considered the Prinertia of a process, and may be used to determine whether the derivation thus far is consistent with Newton's Second Law. Momentum can be determined by using Equation (13), v=D/W and Equation (15) as reflected below in Equation (16):

$$\text{Momentum} = p = Mv = W^2\left(\frac{D}{W}\right) = DW \quad (16)$$

Using the Variational Principle known as the Principle of Least Action, p and v can be considered to be independent variables in phase space that take on the values $p_i,v_i$ at $t_i$ and $p_f,v_f$ at $t_f$. Therefore, action can be reflected as shown in Equation (17):

$$\text{Action} = \int_{ti}^{tf} pv\,dt = \int_{ti}^{tf} DW\left(\frac{D}{W}\right)dt = D^2(t_f - t_i) \quad (17)$$

Because Equation (17) includes all constants, and D is an exogenous constant, a variation in action may be reflected as shown in Equation (18):

$$\Delta(\text{Action}) = 0 = \Delta\int_{ti}^{tf} pv\,dt = \int_{ti}^{tf}\Delta(D^2)dt = \int_{ti}^{tf}(0)dt = 0 \quad (18)$$

Because, as shown in Equation (18), the variation in action is zero, the Euler-Lagrange criterion is satisfied, and Newton's Laws are the equations of motion of a process.

While the role of $W^2$ and –dW/dt in process acceleration is shown above, the role of the D factor, unit demand per unit time, is discussed in the following. Equation (14) may be parsed in two ways. To determine whether the D factor in Equation (14) is part of force –dW/dt or Prinertia $W^2$, the "energy" to accelerate the WIP from the initial velocity to a faster velocity can be calculated. The resulting units of measure of "energy" expended by the external force can be in appropriate units of ½($Mv^2$). The parsing of Equation (14) which fails to achieve this criterion can be rejected. This will thus determine if the D factor is part of Force or Prinertia. Given that $M=W^2$ is dimensionless in a process, process energy can be measured in terms of a velocity squared which is (units/unit time)$^2$, as reflected in Equation (19):

$$1/2(Mv^2) = 1/2\left(W^2\left(\frac{D}{W}\right)^2\right) = 1/2(D^2). \quad (19)$$

In some examples, for the kinetic energy of moving WIP, the term "energy" may not be used in its strict technical sense since energy is typically measured in Joules. Moreover, the Joules expended on WIP, and likewise the dollar value of WIP, may have nothing to do with the velocity of WIP, which is governed by Little's Law, as shown in Equation (11). Therefore the term Process energy or "Prenergy" can be used to describe the process equivalency to ½($Mv^2$) that results from the external force of process improvement. A unit of WIP can be followed down the process. Process improvement may include continually reducing setup time, batch size and, hence, reducing WIP, W. In a unit of time, dt, the unit of WIP can, on average, be slightly accelerated as it moves a distance, ds, through the process, reducing τ, hence increasing the number of production cycles per unit time.

The amount of "Prenergy" applied by the external force of improvement in accelerating the WIP is reflected in Equation (20):

$$\Delta Prenergy = \int_{Si}^{Sf} F\,ds \quad (20)$$

However, if v is the velocity of the WIP then ds=vdt, and with a D factor in Force, $M_M \rightarrow \text{Prinertia}=W^2$ which is dimensionless since W is a dimensionless number, then, as reflected in Equation (21):

$$F = -D\frac{dW}{dt} \quad (21)$$

With v=D/W and ds=D/Wdt, where ds is movement down the process from one workstation to another, therefore a change in Prenergy is reflected in Equation (22):

$$\Delta Prenergy = \int_{Si}^{Sf} F ds \quad (22)$$
$$= \int \left(-D\frac{dW}{dt}\right)\left(\frac{D}{W}dt\right)$$
$$= -D^2(\log W_f - \log W_i)$$

Equation (22) includes the correct units of measure per Equation (19). Other parsings of Equation (14) between mass and force do not necessarily yield the correct units of measure. The right-hand side of Equation (22) resembles the energy expended by an external force in the compression of an ideal gas at constant temperature per Equation (9) with $D^2$ tentatively taking the place of temperature, because n and R are constant and not parameters of the isotherms as is discussed more fully below. The second factor on the right-hand side of Equation (22) is tentatively the entropy change of an economic process at constant temperature. D in Equation (22) is a parameter, rather than a universal constant.

To investigate this new form of external expenditure of process improvement energy $D^2 \log W$, $-\log W$ can be computed to determine its relationship to process improvement, entropy, and information. When the total WIP, W, of a manufacturing process or transactional process is examined, it can include Q different types of items or sub-products in process, or different tasks not yet completed. Then, as reflected in Equation (23):

$$W = w_1 + w_2 + \ldots w_Q = \sum_{i=1}^{Q} w_i \quad (23)$$

In Equation (23), $w_i$ is the number of units of the $i^{th}$ sub-product or task type in WIP. An expression can be derived for Q=2, as shown in Equation (24) and then generalized, as shown below:

$$W = w_1 + w_2 \quad (24)$$

Thus far the natural logarithm $\log W = \log_e W$ has been used. The $\log_2 W = 1.44 \log_e W$ can be used, along with the conversion factor where needed. This allows results to be stated in bits rather than nats. Therefore, as reflected in Equation (25):

$$\log_2 W = \frac{w_1 + w_2}{W} \log_2 W \quad (25)$$
$$= \frac{w_1}{W} \log_2 W + \frac{w_2}{W} \log_2 W$$
$$= -\frac{w_1}{W} \log_2\left(\frac{1}{W}\right) - \frac{w_2}{W} \log_2\left(\frac{1}{W}\right)$$

When adding 0+0, as reflected in Equation (26):

$$\log_2 W = -\frac{w_1}{W}\log_2\left(\frac{1}{W}\right) - \frac{w_2}{W}\log_2\left(\frac{1}{W}\right) + \quad (26)$$
$$\left(\frac{w_1}{W}\log_2 w_1 - \frac{w_1}{W}\log_2 w_1\right) + \left(\frac{w_2}{W}\log_2 w_2 - \frac{w_2}{W}\log_2 w_2\right)$$

Then, as reflected in Equation (27):

$$\log_2 W = -\frac{w_1}{W}\log_2\left(\frac{w_1}{W}\right) - \frac{w_2}{W}\log_2\left(\frac{w_2}{W}\right) + \frac{w_1}{W}\log_2 w_1 + \frac{w_2}{W}\log_2 w_2 \quad (27)$$

Equation (27) can be generalized from Q=2 to Q different types which comprise W by defining the probability that a unit of WIP is the $i^{th}$ product as $p_i = w_i/W$, as reflected in Equations (28) and (29):

$$\log_2 W = -\sum_{i=1}^{Q} p_i \log_2 p_i + \sum_{i=1}^{Q} p_i \log_2 w_i = H_Q + \sum_{i=1}^{Q} p_i \log_2 w_i \quad (28)$$

$$\log_2 W = H_Q + \varepsilon \log_2 w_i \quad (29)$$

In Equation (29), $\varepsilon$ is the expectation, as reflected in Equation (30):

$$\varepsilon \log_2 w_i = \sum_{i=1}^{Q} p_i \log_2 w_i \quad (30)$$

The term $H_Q$ of Equation (29), as reflected in Equation (31), may be referred to as the Shannon Equation of Information in bits:

$$-\sum_{i=1}^{Q} p_i \log_2 p_i = H_Q \quad (31)$$

The term $H_Q$ is also identical to the Boltzmann expression for thermodynamic entropy, as reflected in Equation (32), with k=1:

$$S = -k\sum_{i=1}^{Q} p_i \log_2 p_i \quad (32)$$

Thus, the nature of the work for the reduction of log W to accelerate the process and eliminate waste is equivalent to the increase in information added to the process to reduce entropy. Shannon's equation of information is developed from first principles below. As shown above in Equation (31), $H_Q$ is entropy in bits, and the term $\varepsilon \log_2 w_i$, as reflected in Equation (33), can also be represented by bits:

$$\sum_{i=1}^{Q} p_i \log_2 w_i \quad (33)$$

Hence Equation (29) can be defined as the Generalized Entropy of a Process.

The role of each term in Equation (31) can be explained as follows. For example, if it is assumed that each of the Q items of WIP, W, had about the same quantity of units $w_i \cong W/Q$. Then the probability of occurrence of the $i^{th}$ item is $p_i \cong w_i/W=1/Q$ and, as expressed in Equation (34):

$$H_Q = -\sum_{i=1}^{Q} p_i \log_2 p_i \qquad (34)$$
$$= -\sum_{i=1}^{Q} \frac{1}{Q} \log_2 \left(\frac{1}{Q}\right)$$
$$= -\left\{\frac{1}{Q}\log_2\left(\frac{1}{Q}\right) + \frac{1}{Q}\log_2\left(\frac{1}{Q}\right) \ldots Q \text{ terms}\right\}$$
$$= \log_2 Q$$

Therefore, H represents the variety of internal products in WIP to deliver m different end products to the customer. H can be reduced by reducing complexity, Q, through internal standardization. For example, a company reduced the number of internal part numbers to produce a fixed external product line from approximately Q=1000 to 260. For approximately uniform usage, $H_Q \sim \log_2 1000$, whereas $H_{Intrinsic} \sim \log_2 260$, where Intrinsic refers to a minimum irreducible set of components. In addition, the reduction of complexity, Q, reduces the entropy due to the second term in Equation (29). The gross profit margin increased from 18% to 37% as a result of the reduction in complexity. The larger is Q and H, the more setups may be required to meet demand, hence the greater the non value add cost of setup time, and accompanying scrap as well as the cost of tooling and dies. Value add costs add a form, feature or function valued by the customer. All else can be waste, such as for example, the cost of setup, scrap, rework, warehousing, distribution, labor and overhead cost. The minimum amount of non value add cost is determined by the Value Stream Mapping process. As Q is reduced, more volume is driven through fewer part numbers leading to lower procurement costs, with similar impact on non-manufacturing processes.

The second term in Equation (29) can similarly be understood. Assuming that $p_i \cong 1/Q$, $w_i \cong W/Q$, then as reflected in Equation (35):

$$\varepsilon \log_2 w_i = \sum_{i=1}^{Q} p_i \log_2 w_i \qquad (35)$$
$$= \sum_{i=1}^{Q} \left(\frac{1}{Q}\right) \log_2 \left(\frac{W}{Q}\right)$$
$$= \left(\frac{1}{Q}\right) \log_2 \left(\frac{W}{Q}\right) + \ldots Q terms$$
$$= \log_2 \left(\frac{W}{Q}\right)$$

Therefore the second term, $\varepsilon \log_2 w_i$, can represent the log of the average amount of WIP per part number. Thus the larger the term $\varepsilon \log_2 w_i$ is, the larger the waste due to, for example, scrap, rework, obsolescence, maintenance of warehouses and distribution centers, transportation costs, and IT systems, and all related indirect personnel to control and store all the material as well as expediting expense to compensate for long lead times. In manufacturing, the term $\varepsilon \log_2 w_i$ may be primarily driven by setup time, machine downtime, and quality defects.

For example, material cost of a product can be fixed. However, complexity reduction can drive the unit volume of each component up, thus reducing procurement and purchase cost. Scrap and rework costs can fall in direct proportion to WIP because less material is at risk prior to usage and test, and the resulting shorter lead time results in more cycles of learning and improvement. In addition, shorter lead time can lead to less fixed capital investment and working capital costs. In some material or energy intensive industries there may be a "plateau" on which the potentially WIP sensitive cost rides. The thermodynamic distinction between costs that can and cannot be removed is further discussed. As a conservative estimate, the WIP sensitive costs include the total cost of labor, overhead, and quality as well as the cost of capital, to name a few examples. In the analysis that follows, costs related to WIP can be susceptible to major reduction, be they manufacturing or transactional.

Irreversibility can enter into microeconomic processes. The purchase of raw material can be so negotiated that untouched material can be returned to the supplier for a small "restock" charge, and hence the procurement process is an example of a nearly reversible cost. The cost of raw material is thus analogous to the inevitable losses in a Carnot cycle engine.

Once raw material is injected into a manufacturing process, labor and machinery transform it into intermediate states that can exit as finished goods and be sold to a customer. Otherwise the cost of the WIP can be recognized as waste. The manufacturing process, and indeed any process can therefore be entirely irreversible. A single item of raw material may take on Q different part numbers in WIP, and the total amount of material $w_i$ in WIP may be much larger than in raw material. This greatly increases the entropy in Equation (29). Thus the increase in entropy is due to the irreversibility of WIP and is analogous the free expansion of a gas as initially discussed in Equation (3). The goal is to reduce WIP to the minimum using process improvement.

In the example above, the costs of complexity can be reduced through engineering and design choices. Such choices may be considered to add information that reduces the entropy (related to number of internal choices) to produce the same external product line. The added information can reduce both the material cost (for example, due to higher volume per part) and lower labor cost (due to, for example, fewer setups, less scrap, fewer "stock outs" and downtime, simplified stock control, and standardized assembly and test procedures). The residual irreversible costs related to the large WIP can be eliminated by reducing setup time, processing time per unit, scrap and rework using Lean Six Sigma process improvement tools, for example.

To reduce irreversible costs that can be avoidable waste, the relationship between process improvement and resulting WIP can be examined. These relationships are presented for both manufacturing and non-manufacturing processes, discussed below.

Two principal expressions for the calculation of WIP as a function of demand per unit time and process parameters have been derived. The minimum WIP in a factory has been derived, and a representative equation shown below as Equation (36):

$$FactoryWIP \geq \frac{QAsD}{1 - X - \zeta D} + QA, \qquad (36)$$

where s represents setup time, A represents a number of workstations in the process, X represents a defect rate, Q represents the number of internal part numbers, D is demand per unit time (e.g., month), and $\zeta$ represents a processing time per unit. Reducing the number of different internal part numbers, Q, by 50% reduces WIP by 50%. For example, the actual WIP in a factory can be 10-20 times the minimum of Equation (36).

The cause of this massive WIP can be due to scheduling policy such as using the economic lot size formula for batch sizing as is done by many Enterprise Resource Planning (ERP) programs. This effectively disconnects WIP from immediate actual market demand. The reduction of WIP is possible due to the improvement process, principally due to the implementation of pull systems to synch up WIP with demand, followed by reduction setup time, s, and defect rate, X, through Lean Six Sigma and the number of different internal part numbers, Q, through complexity reduction. Traditional manufacturing engineering focused on reducing processing time per unit, $\zeta$, often through time and motion studies and automation. Finally as the setup time, s, approaches zero, WIP approaches the product of the number of internal part numbers, Q, and the number of workstations, A. Hence, the independence of WIP from changes in demand, D, holds throughout the improvement process. Similar conclusions may be drawn from transactional processes discussed below.

A conclusion is that WIP, W, and, hence, $w_i$ and $\epsilon \log w_i$, are driven by process improvement and are virtually independent of demand, D, until WIP→QA. $H_{complexity}$ is driven down by complexity reduction initiatives and is independent of demend, D, for all levels of demand. In general, Q is directly proportional to the number of external part numbers, m, shipped to customers.

If the setup time, s, can be driven toward zero, then according to Equation (37), below, $w_i=1$, and because log(1)=0:

$$W = 2^{H + \epsilon \log 2 \, w_i} = 2^H 2^{\epsilon \log 2 \, w_i} = 2^H 2^0 = 2^H \qquad (37)$$

In such an instance, there is one unit per part number hence $p_i \equiv 1/Q$, $H \equiv \log_2 Q$ and W→QA in Equation (36). In this instance log Q→Entropy H. Generalized entropy log W≧H and hence in general is larger than log of the number of accessible states (the definition of entropy) of the market which will be studied below.

In a microeconomic process in which the customers are not offered a selection of products, and each workstation produces only one part, the setup time, s, in Equation (36) is zero and log Q=H. Thus, adding information to the process to reduce setup time and defects reduces generalized entropy and waste.

A transactional (non-manufacturing processes) such as product development, marketing, and planning, generally does not have the opportunity to batch identical items. In non-manufacturing processes, the $\epsilon \log_2 w_i$ term is primarily driven by defects and non-value-added costs rather than setup time. The WIP in a transactional process is approximated by in Equation (38), a fundamental equation of transactional processes:

$$WIP = \text{No. of Tasks In Process} \qquad (38)$$

$$\cong \left(\frac{1}{K+1}\right)\left(\frac{\rho^2\{1+Z\}^2}{1-\rho\{1+Z\}}\right)\left(\frac{C_S^2 + C_A^2}{2}\right)$$

In Equation (38), $\rho$ represents a percentage of maximum capacity utilized, K represents a number of resources cross trained, Z represents a percentage of defectives that can be reworked, $C_S$ represents a coefficient of variation of time to perform tasks, $C_A$ represents a coefficient of variation of arrival of tasks, and C is represented in Equation (39):

$$C = \frac{\sigma = 1 \text{ Standard Deviation}}{\mu = \text{Mean Time}} \qquad (39)$$

The application of Equation (39) to process improvement is first applied to the product development process. The challenge in applying Lean Six Sigma and complexity reduction to transactional processes is the near complete absence of process data. Even the application of Little's Law is hampered by the lack of data on average completion rate and number of units of WIP, data that is commonly available in manufacturing. However, the widespread training in Lean Six Sigma principles created the capability to capture and use this data in non-manufacturing processes. A conclusion is that large WIP can be due to a bad process and causes waste. However, less apparent is the impact of internal complexity upon waste which is the subject of a case study below. Both forms of waste can be comprehended in a theory of microeconomic waste.

Entropy has connections with initiatives such as Lean, Six Sigma and Complexity reduction. These initiatives inject information into the process, and that information can be negative entropy which reduces waste. Information, which may be represented by the term I, conveys something unexpected or previously unknown. For example, information that there is there was four feet of snow on the ground in Dallas on a July day, this highly improbable event would be unexpected, and, hence, convey huge information.

Therefore, the amount of information is inversely related to the probability of the event. Additionally, regardless of the functional form of the information, if two independent events, a first event and a second event, occur, the total information is the sum of the separate information of the first event (information $I_1$) and the second event (information $I_2$). But the probability of the first event and the second even both occurring is the product of the probability of each individual event occurring. The probability of the first event occurring may be represented by $p_1$ and the probability of the second event occurring may be represented by $p_2$. Thus, the probability of both the first event and the second event occurring may be expressed as $p_{1\&2} = p_1 p_2$. So some function is necessary for information, I, such that: $I_{1\&2}(p_1 p_2) = I_1(p_1) + I_2(p_2)$ and the function that satisfies this requirement is $I = \log(p)$ since log $(p_1 p_2) = \log(p_1) + \log(p_2)$. Therefore, $I(p) = \log(p)$. But because it is desirable that the information to be larger if the probability of occurrence is smaller, we will define $I(p) = \log(1/p) = -\log(p)$, which still satisfies $\log(1/p_1 p_2) = \log(1/p_1) + \log(1/p_2)$.

The average amount of information among N choices is the sum of the probability of each choice times the value of each choice, as reflected in Equation (40):

$$H = -\sum_{i=1}^{N} p_i I_i = -\sum_{i=1}^{N} p_i \log_2 p_i \quad (40)$$

Equation (40) is known as the Shannon equation of Information. Note that it is similar to the entropy of statistical mechanics, as reflected in Equation (41), but with k=1:

$$S = -k \sum_{i=1}^{N} p_i \log_2 p_i \quad (41)$$

The thermodynamics of process velocity yields k=1 automatically. Hence, microeconomic processes are accelerated by the addition of information. It can now be shown how the market place transmits information to the company. For example, a company produces two products, product 1 in quantities $d_1$ per month, and product 2 in quantities $d_2$ per month, where $d_1+d_2=D$ total units produced per month. The actual demand of the market for the two products is random, and results in a variety of possible sequences such as:

| 1121221122212212 |
| 2211212211121221 |
| 2122122111211212 |

The market makes N choices monthly (in this example, the unit of time is a month) of either 1 or 2. Each sequence is a state of the market or complexions. The number of distinct sequences or "messages" sent by the market, to be satisfied by the company, is calculated by the combinatorial formula as reflected in Equation (42):

$$\text{Number of District Messages} = M \quad (42)$$
$$= \frac{D!}{d_1! d_2!}$$
$$= \binom{D}{d_1}$$
$$= \frac{D!}{d_1!(D-d_1)!}$$

By taking the logarithm of the number of states, which in the microeconomic case is the number of distinct messages from the market, then according to Stirling's formula, to first order, as reflected in Equations (43) to (47):

$$\log_2 D! \cong D \log_2 D - D \quad (43)$$

$$D = (D - d_1) + d_1 = d_2 + d_1 \quad (44)$$

$$\log_2 M = (D \log_2 D - d_1 \log_2 d_1 - (D - d_1) \log_2 (D - d_1)) \quad (45)$$

$$\log_2 M = (((D - d_1) + d_1) \log_2 D - d_1 \log_2 d_1 - (D - d_1) \log_2 (D - d_1)) \quad (46)$$

-continued $$\log_2 M = -\left((D - d_1) \log_2 \left(\frac{D - d_1}{D}\right) + n_1 \log_2 \left(\frac{d_1}{D}\right)\right) \quad (47)$$

By multiplying by D/D, Equation (48) is obtained:

$$\log_2 M = -D\left(\left(\frac{D - d_1}{D}\right) \log_2 \left(\frac{D - d_1}{D}\right) + \left(\frac{d_1}{D}\right) \log_2 \left(\frac{d_1}{D}\right)\right) \quad (48)$$

If $p_1=d_1/D$, and $p_2=(D-d_1)/D$, then Equation 49, below, is obtained:

$$\log_2 M = D(-\{p_1 \log_2 p_1 + p_2 \log_2 p_2\}) \to D\left\{\sum_{i=1}^{m} p_i \log_2 p_i\right\} \quad (49)$$
$$= DH_m$$

For m products, and $M=2^{DH_m}$=Number of Distinct Messages M due to m different products. Shannon's equation for Information emerged naturally. The market is making D variety choices per month, selected from one of the m products, each of the D events per month containing information of $H_m$ bits. The M messages per month corresponds to the number of unique states per month, as reflected in Equation (50):

$$H_m = -\sum_{i=1}^{m} p_i \log p_i \quad (50)$$
$$= \text{Shannon Information in Bits per Choice}$$

Therefore, the Transmission Rate of Market is reflected in Equation (51):

$$\text{Transmission Rate of Market} \to \quad (51)$$
$$DH_m \to \left(\frac{\text{Choices}}{\text{Month}}\right)\left(\frac{\text{Bits}}{\text{Choice}}\right) \to \text{Variety Bits per Month}$$

Thus the market is acting like a communication system, transmitting $DH_M$ bits of information per month about the variety of products the market wants to buy that the company presently offers. For example, initially the market may demand utility transportation and an automaker may respond with m=1 in the form of a single automobile offered by the automaker. As tastes evolve, the market demands more variety, e.g., m of five or more, and the original single automobile offered by the automaker becomes obsolete. Thus, the market began sending more complex messages.

The goal is to reduce WIP, W, such that the amount of information in a factory is equal to that needed to produce any part number or number of choices demanded by the market, and no more. The production of m different end items needed to compete with, for example, another auto manufacturer may require Q different items of WIP. Each of the choices the market makes per month carries $H_m$ bits of information, as shown in Equation (51), which translates to $H_Q$ bits of internal information.

A conclusion is that entropy, $H_m$, flows from the marketplace to the company through the revenue stream. The company responds to input $H_m$, transforming the m different products desired by the marked to Q different subsystems with corresponding entropy of component variety $H_Q$. The internal processes add total entropy $H_Q-H_{intrinsic}+\epsilon \log_2 w_i$. Lean Six Sigma initiatives drive $\epsilon \log_2 w_i \rightarrow 0$ by driving $w_i \rightarrow 1$. Through Complexity reduction initiatives, $H_Q$ is driven down to $H_{intrinsic}$ by eliminating $H_{complexity}$, thus achieving the minimum irreducible set needed to produce m different external products for customers. Although $H_{intrinsic}$ may not be known, differences in entropy may be sufficient for this purpose. Therefore, as reflected in Equation (52):

Generalized Entropy=log $W=H_{intrinsic}+H_{complexity}+\epsilon \log w_i$ (52)

Thus, the company draws in entropy $H_m$, the operations process expands the drawn in entropy to $H_{intrinsic}+$waste, and compresses $H_{intrinsic}$ to $H_m$ and expels $H_m$ as a product. The connection between revenue and the internal process is $H_m$, and the response of the process in creating total entropy which in turn increases the cost per unit.

A goal of process improvement in general is to reduce the addition of process entropy due to complexity, setup, quality defects, to name a few examples, and its associated waste to zero. The equality of input and output entropy corresponds to maximum efficiency for a given Q.

In Equation (36), an interpretation has been developed in which the two sources of waste, complexity and process deficiencies (setup, defects, etc) appear co-equally important. The internal entropy of a process has now been determined. The internal temperature of the process as $D^2$ in Equation (22) has been derived from Little's Law which is independent of dollars of cost or revenue. To determine the waste that can be eliminated and apply Equation (3); $T_C$, the external cold temperature related to the cost of the process can be determined, which when multiplied by the generalized entropy will yield the waste in a process. The external temperature of the Revenue (hot source) and the Cost of Goods Sold (cold sink) can be computed using the general thermodynamic relation between entropy and energy. From thermodynamics, as represented in Equation (53):

$$\left(\frac{\partial \text{Entropy}}{\partial \text{Energy}}\right)_{V,N} = \frac{1}{\text{Temperature}}. \quad (53)$$

Below, it is shown that $T_{Revenue}=r=$revenue per unit, and $T_{Cost}=c=$avg cost per unit. Both r and c are intensive variables as is Temperature, whereas entropy and WIP are extensive variables. The cost per unit c are those costs susceptible to reduction by WIP reduction. Again, as a conservative estimate, these costs can include the total cost of labor, overhead, and quality as well as the cost of capital, to name a few examples and provide a starting point. In most cases we have found that the cost of material is similarly susceptible to reduction through complexity reduction. Virtually all of the entropy in WIP is irreversible in analogy with the free expansion of a gas. In Equation (9), the conversion of internal entropy to waste in an external heat sink was through nR, with n being the number of moles and R being the gas which was experimentally determined. Because c is the cost per unit, set n=1 and determine the coupling of internal entropy to an external heat sink through the experimentally determined value $R_e$. Therefore, an equation for the waste in a microeconomic process subject to experimental verification may be determined. From Equation (9) it may be determined, as reflected in Equations (54) and (55), that:

Waste in a Thermodynamic Process³=
$nR$(Cold Temp)(Entropy)$=nRT_C \log(V_f/V_i)$ (54)

Waste in a Microeconomic Process=
$(R_e)(c)$(gen entropy)³$=(R_e)c \log_2(W_f/W_i)$/unit (55)

The value of $R_e=$the Gas Constant of microeconomics, measured in reciprocal bits, may be determined empirically. Therefore, a guiding principle is that the reduction of generalized entropy is a key to the elimination of microeconomic waste and increase of profit just as reduction of entropy is the guiding principle of heat engine design. An Equation of Profit is reflected in Equation (56):

Increased Profit=$\Delta$Profit=(Waste)$_{Initial}$-(Waste)$_{Final}$ (56)

As Equation (36) shows, if a lean initiative is launched and the volume and related revenue doubles setup times were cut in half, the total WIP and hence waste can remain constant. Thus, the same amount of waste can be spread over twice as much output. Therefore, changes in revenue can be corrected for by multiplying final WIP by a correction factor $\alpha_R$ as shown in Equation (57):

$$\alpha_D = \frac{(\text{Demand/unit time})_{initial}}{(\text{Demand/unit time})_{final}} \quad (57)$$

When several periods are compared from an initial condition, the initial starting point in the numerator can be fixed with subscript 1, and subsequent periods in the denominator can bear their period number. For example, item 4 of Table 1 shows that the ratio of WIP in each period is the ratio of the WIP in the period to the WIP in the first (or initial) period.

Because demand per unit time may not be readily available, revenue can generally be used as a surrogate, and per Equation (36), the same factor applies to change in complexity $c_i$=cost per unit initial, $c_f$=cost per unit final, as reflected in Equations (58) to (60):

$c_i-c_f=\Delta$Waste$=R_e c_i (\log W_i - \log W_f)$ (58)

$c_i=c_f-R_e c_i(\log W_i - \log W_f)$ (59)

$\Delta$Profit/unit$=c_i-c_f=R_e c_i(\log W_i - \log W_f)$ (60)

With the revenue correction factor, equations of projected cost reduction can be determined, as reflected in Equation (1a) and (61):

$$\text{Cost/Unit as \% of Initial} = \frac{c_f}{c_i} \quad (1a)$$

$$= 1 + R_e \log\left(\frac{\alpha_D W_f}{W_i}\right)$$

$\Delta$\$Profit/unit output $= R_e(\$ci)(\log W_i - \log(\alpha_D W_f))$ (61)

For these equations to be useful to predict potential cost reduction due to process improvement, the magnitude of $R_e$ can be estimated as shown in the following case studies.

In a example, a \$2.3 billion revenue computer products company is losing money on a product line that includes $m_{initial}=3500$ different end items. From Equation (36) it is known that the number of internal part numbers, Q, is proportional to the number of external part numbers m shipped to customers. Hence, cutting m in half cuts the number of internal part numbers, Q, and hence WIP in half. The new CEO reduces the number of part numbers offered to customers to $m_{final}=499$. The gross profit increases from 32% to 43%, due to a 32% reduction in labor and overhead cost. Table 1 illustrates the relevant data.

TABLE 1

| Parameter | Year 1 (i = 1) | Year 2 (i = 2) | Year 3 (i = 3) |
|---|---|---|---|
| 1. Number of External Products, m | 3500 | 2300 | 499 |
| 2. Revenue in Millions of Dollars | 2300 | 3200 | 4000 |
| 3. $\alpha_D = (Demand)_1/(Demand)_i$ | 1 | 0.72 | 0.58 |
| 4. $WIP_i/WIP_1$ | 1 | 0.59 | 0.14 |
| 5. $\alpha_D (WIP_i/WIP_1)$ | 1 | 0.43 | 0.08 |
| 6. $Qi = (COGS\% \text{ of Revenue})_i/(COGS \% \text{ of Revenue})_1$ | 1 | 0.96 | 0.83 |

Referring to FIG. 4, a graph 400 illustrates an example relationship between cost reduction versus reduction in WIP. In particular, the graph 400 depicts a cost reduction vs. WIP reduction (item 5 vs. item 6 in Table 1). A curve 410 shows the relationship between cost reduction and WIP reduction for this example. The curve 410 may be fit to data points 415a, 415b, and 415c, which are fit to an equation 420. In this example, the equation 420 has a coefficient of 0.065 for the natural log, converting this to $\log_2$ using $\log_2 X = (\log_e X)(\log_2 e)$, and since $\log_2 e = 1.44$ we have, according to Equation (1), $R_e = (0.065)(1.44) = 0.093$, as a first estimate of the gas constant of a microeconomic process. Return on investment of the initiative in this case study is approximately 300% per year.

In a second example, a company produces m=168 different products with an average cost per part of $50 and operates at 10.5% Gross Profit Margin (GPM). Because internal components are quality tested and approved by clients, negligible opportunity for internal complexity reduction exists. Rather that waste has to be eliminated via classical system lead time reduction. It is estimated that cost of goods sold could be reduced 3%, whereas actual cost is reduced by 8%. The lead time is reduced from 14 days to 4 days resulting in major revenue growth. The result of cost reduction and revenue growth resulting from lead time reduction results in earnings before interest, taxes, depreciation, and amortization (EBITDA) growing from $10.4 Million to $46.7 million in three years. In particular, the setup time at key workstations was reduced from an average of 2 hours to approximately 10 minutes, the resulting gross profit margin increased from 12.0% to 19.5%, the operating margin grew from 5.4% to 13.8%, sales grew from $144 million to $311 million per year, cost of goods sold rose from $127.4 Million to $250.6 Million, and the product complexity remained approximately constant. Table 2 illustrates the relevant data.

TABLE 2

| Parameter | Year 1 (i = 1) | Year 2 (i = 2) | Year 3 (i = 3) | 4 (i = 4) |
|---|---|---|---|---|
| 1) Number of External Products, m | 168 | 155 | 170 | 175 |
| 2) Revenue in $Millions | 144 | 191 | 246 | 311 |
| 3) $\alpha_D = Demand_i/Demand_1$ | 1 | 0.75 | 0.58 | 0.46 |
| 4) $WIP_i/WIP_1$ | 1 | 0.96 | 0.96 | 0.57 |
| 5) $\alpha_D (WIP_i/WIP_1)$ | 1 | 0.72 | 0.56 | 0.26 |
| 6) $Qi = (COGS \% \text{ of Revenue})_i/(COGS \% \text{ of Revenue})_1$ | 1 | 0.98 | 0.97 | 0.91 |

Referring to FIG. 5, a graph 500 illustrates an example relationship between cost reduction versus reduction in WIP. In particular, the graph 500 shows a reduction of cost (item 6) vs. reduction of WIP (item 5). A curve 510 shows the relationship between cost reduction and WIP reduction for this example. The curve 510 may be fit to data points 515a, 515b, 515c, and 515d, which are fit to an equation 520. In this example, a second estimate of the gas constant of microeconomics is $R_e = (0.067)(1.44) = 0.097$.

As can be seen from the data, the actual reduction of Cost of Goods Sold is 8% and is consistent with the equation of projected cost reduction which asserts that waste is a function of log W. For large initial values of W, small changes in W remain in the flat area of the log curve 510. Dramatic reductions toward the origin can drive the log function down. This effect can be considered counterintuitive and suspect when first observed, and its best fit to a log function can be puzzling. Notice that the actual data shows that as W is initially reduced, the cost reduction is modest. As W approaches 35% of its original value, the cost suddenly falls. One of the major items of non value add cost that is eliminated is a warehouse comparable in size to the factory. The cost of the warehouse is fairly constant as WIP/part number fell. When WIP/part number and lead time fall to 35% of their original value, the lead time is such that the warehouse could be closed leading to a quantum of cost reduction. Non-value-added costs are often quantized, and this quantization can be the phenomenological reason why waste reduction follows a log curve.

The cost reduction can proceed until the waste is removed and only the value add cost remains. In a manufacturing process this sets $W_f$ in Equation (22) at Q. In a transactional process this sets $W_f$ at the number of workstation in the process, e.g., the one task or work unit per workstation. Equation (36) predicts that complexity reduction which reduces Q is just as powerful as Lean initiatives which reduce $w_i$. This is also evident from Equation (36) for factory WIP.

It can be shown that a microeconomic process is improved by the addition of information. This can be illustrated with a specific example which relates process improvement to information. For example, when processing in batches of quantity B, an amount of information is added by selecting a given product to setup and run. Assume that a factory includes A workstations, each of which processes on average Q/A=N part numbers. If there are N products produced at a given workstation, the decision to select one creates $H_N$ bits of information. However, the probability is 1 of running that product for the rest of B−1 units in the batch. Therefore, the B−1 units add zero information. As the setup time is cut in half, the batch size can be cut in half and still maintain the same production rate according to Equation (53). Now however, information is added twice as often because the particular product of the N possibilities is selected twice as often. In general, the information supplied to the process is thus reflected in Equations (62) and (63):

$$I_N = \text{Information in production of } N \text{ Product's per month} = \frac{N}{B} H_N \quad (62)$$

$$B \geq \frac{sD}{1 - X - \zeta D} + 1 \quad (63)$$

In Equations (62) and (63), s represents setup time, X represents scrap rate, $\zeta$ represents processing time per unit, D represents total demand in units per unit time (B can increase as a function of variation of parameters via simulations). Therefore, as reflected in Equation (64):

$$I_N = \frac{N}{\left(\frac{sD}{1 - X - \zeta D} + 1\right)} H_N \to N H_N \text{ as } s \to 0 \quad (64)$$

For A workstations, AN=Q to produce m external products for customers, as reflected in Equation (65):

$$ANH_N \rightarrow QH_N \rightarrow H_m \tag{65}$$

Thus a goal of the system is to respond "Just In Time" and produce what is needed when it is needed is equivalent to an information flow within the factory which matches market demand. In regard to entropy due to average WIP, Lean Six Sigma process improvement results in Equations (66) and (67):

$$S_{initial} - S_{final} = c_0 k_W \varepsilon_Q (\log_2 w_{jinitial} - \log_2 w_{jfinal}) \tag{66}$$

$$S_{initial} - S_{final} = c_0 k_w \varepsilon_Q \left( \log_2 \left( \frac{S_{initial} D}{1 - X_{initial} - \zeta_{initial} D} + 1 \right) - \log_2 \left( \frac{S_{final} D}{1 - X_{final} - \zeta_{final} D} + 1 \right) \right) \tag{67}$$

Applying Lean initiatives such as driving s→0 drives entropy related to WIP→0 and leaves the entropy related to $H_m$ due to the Complexity of parts. Applying Six Sigma to drive X→0 can be of equal power. The addition of information by Lean Six Sigma as a means of reducing entropy is merely one example of a general theory propounded by the Physicist Leon Brillouin in which he coined the term Negentropy for Information since it is Negative Entropy as is seen in Equation (90) as the amount of entropy subtracted by addition of process information. Although the specific process improvement tools change, the same conclusion can apply to transactional processes. For a manufacturing process the minimum WIP is Q, that is, one of every internal item necessary to produce the current mix of products. For a transactional process the minimum WIP is one task per step in the process, or A since there are A steps.

Operational Procedure to Predict Cost reduction due to Process Improvement Estimation of Non-Value-Added Cost A Value Stream Mapping process can determine the value-added and non-value-added cost of the process. Value Stream Mapping includes walking the flow of the work-in-process and noting if each step adds a form, feature or function without which the customer will find the output unacceptable. The cost of those steps that meet this criterion are known as value add cost. Those steps which do not, in whole or in part meet this criterion, contain non-value add costs. The sum of these non value add costs will, according to equation (1) tend to zero as WIP falls according to equation (69) below. Most of the non-value-added cost resides in labor and overhead cost and can exceed 50% of those costs.

Measurement of Current WIP

The number of units of initial WIP, $W_i$, at each workstation or node and average completion rate can be determined. This information is typically available in manufacturing companies but can be gathered empirically in non-manufacturing processes. The minimum WIP can also be defined as $W_f = Q_f$ (number of internal part numbers needed to produce output after complexity reduction initiative) in manufacturing, and $W_f = A$ the number of steps in a transactional process. If the company is experiencing growth, the Revenue$_{initial}$ and Revenue$_{final}$ (after Y years of improvement) can be estimated to compute $\alpha_D$ in Equation (57).

Defining the Maximum Cost Reduction Improvement Goal

Given the data in Equation (3), the maximum profit improvement can be computed that can result from process improvement, as reflected in Equation (69):

$$\text{Max \% Reducation in Cost of Goods Sold} = 1 + R_e \log_2 \left( \frac{\alpha_D W_f}{W_i} \right) \tag{69}$$

This value, multiplied by current Cost of Goods Sold, should be less than the total non-value-added cost defined on page 44 as a check on the data.

Cost of Process Improvement

The cost of achieving minimum WIP, $W_f$, or some practical alternative to minimum WIP, can be the basis for a request for quotation to determine the invested Capital $C from the many process improvement consultants. The initiative should include Lean, Six Sigma, and internal and external Complexity reduction. As an alternative, the company can consider the use of internal resources. Whatever $W_f$ is chosen, the resulting percent reduction in WIP can be substituted into Equation (69) and multiplied by the current Cost of Goods sold to obtain the increase in profit ΔP.

Return on Capital

The company can estimate the company's share price multiple M of earnings before interest, taxes, and depreciation from the appropriate stock market (M=14 for the S&P 500 as of October 2007). The Return on Capital can be calculated, as reflected in Equation (70):

$$ROC \% = \left( \frac{M(\Delta P)}{C} \right)^{\frac{1}{Y}} - 1 \tag{70}$$

If the ROC exceeds 100% per year it can more than justify management execution of process improvement on a risk adjusted basis. ROC %=11% for the S&P 500 October 2007.

Guidance for Management

Complexity Reduction

Because of Equation (36) the impact $H_Q$ of the Cost of Complexity can be viewed as yet another source of profit improvement of equal magnitude to Lean Six Sigma initiatives which reduce $w_i$.

Greatest Gains can be from High Hanging, Rather than Low Hanging Fruit

The equations of projected cost reduction, such as Equation (1), predict that waste will follow a log W curve. Referring to FIG. 6, a graph 600 shows that gains from modest reductions of WIP can be negligible but a reduction of WIP of greater than 70% will yield significant returns per the Equations of Profit (e.g., Equation (1)). Thus the "high hanging fruit" are biggest as is depicted by the log curve 610 and can be limited by $W_{final}$.

Thus a goal to drive WIP to Q, that is one unit of each item, can be understood. Using equations, one can conservatively estimate c as total cost of labor, overhead, and quality as well as the cost of capital per unit of output.

The market is transmitting $DH_m$ bits per month, per Equation (61). The company receives information at this rate and may processes the information per Equation (1), for example. If the company can apply process improvement such that the rate at which the company internally processes information matches the rate of transmission from the market, related waste is eliminated. The system is therefore a process of maximizing the external entropy of the product offering so that it responds to the market subject to; of maximizing profit by the reduction cost by process improvement of complexity reduction and process improvement, and of increasing revenue growth by expanding the profit frontier of offering complexity though process improvement and rapid product development.

Figure 7:
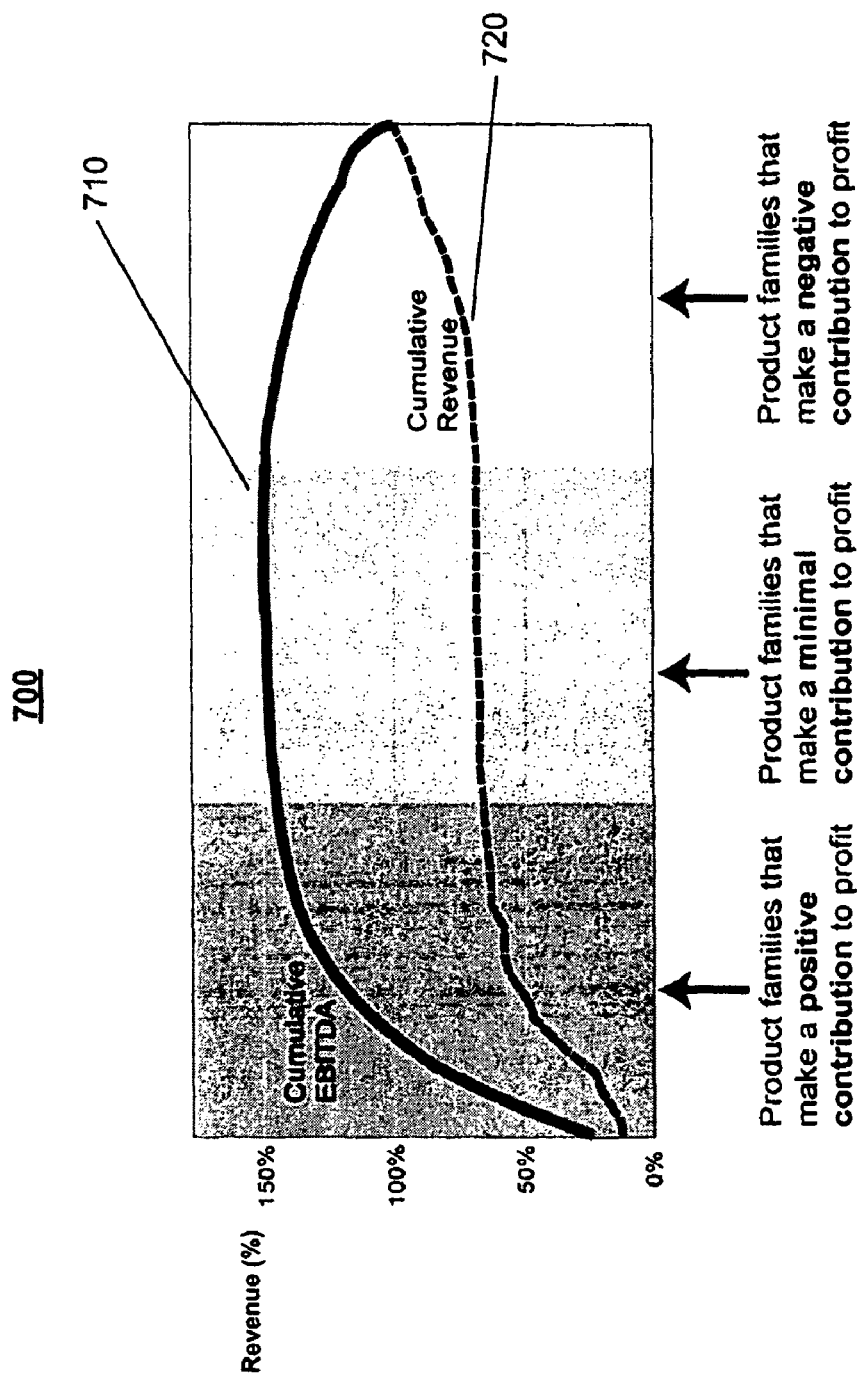
FIG. 7 depicts a graph of revenue variations.

Referring to FIG. 7, a graph 700 shows how revenue varies between product families for cumulative EBITDA 710, and cumulative revenue 720.

The overall goal of management can be to maximize shareholder value through growth of economic profit, generally defined as operating profit less cost of capital. Increasing m, the breadth of the portfolio of products offered to customers has a higher probability of responding to market demand by increasing $DH_m$ in Equation (61), increasing revenue and potentially profit. Portfolio entropy $H_m$ equates to the market applying input entropy $H_Q$ to the process. Increasing m will, however, increase internal complexity, Q, as well as $w_i$ in Equation (36) and hence increasing $H_Q$ and $\epsilon \log_2 w_i$ and hence increasing $\log_2 W$ and waste. The optimization process can involve maximization of economic profit subject to the increasing revenue less increasing cost. At maximum, the next incremental cost of complexity due to Q+1 can be greater than the resulting incremental economic profit. The optimization is driven by the forces of market demand and changes over time, an example of which was given in the discussion following Equation (61). Process improvement plays the pivotal role of allowing increases in customer portfolio m which reducing waste related to log W, as demonstrated by the large ROI of the case studies.

Companies report manufacturing WIP once per year in the inventory footnotes of their financial statements (such as Internal Revenue Service "Form 10K" in the United States). However, companies do not report unit volume, but revenue data may be used as a surrogate for unit volume. In addition, companies do not report and often do not even capture the data on WIP or cost of transactional processes.

To obtain statistically significant data, WIP and unit volume can be measured periodically (such as monthly) during an improvement process in both manufacturing and transactional processes and correlated with cost reduction. This can allow the value of the gas constant of microeconomic processes to be more accurately defined, to determine if the gas constant is universal for both manufacturing and transactional processes, and confirm, modify or confute the equation of projected cost reduction.

In the next section, it is demonstrated that Shannon Entropy is proportional to Boltzmann Entropy, as expressed in Equation (71):

Boltzmann Entropy=$S$=$k \log \Omega$, where $\Omega 2$=Number of distinct States (71)

Assuming M=2 types of products where $d_i$=number of the $i^{th}$ product shipped in a month, and $D=d_1+d_2$, then Equation (72) follows:

$$\Omega = \frac{D!}{d_1! d_2!} \log \Omega = \log D! - \log d_1! - \log d_2! \quad (72)$$

In Equation (71) and Equation (72), the exclamation points represent factorials. Stirling's approximation can be derived to second order from Poisson distribution as reflected starting in Equations (73) and (74):

$$\log D! = D \log D - D + \frac{1}{2} \log 2\pi D \quad (73)$$

$$\log \Omega = D \log D - D + \frac{1}{2} \log 2\pi D - \quad (74)$$
$$\left(d_1 \log d_1 - d_1 + \frac{1}{2} \log 2\pi d_1\right) - \left(n_2 \log d_2 - d_2 + \frac{1}{2} \log 2\pi d_2\right)$$

Since $D=n_1+n_2$, Equations (75) to (80) result:

$$\log \Omega = D \log D + \frac{1}{2} \log 2\pi D - \quad (75)$$
$$\left(n_1 \log d_1 + \frac{1}{2} \log 2\pi d_1\right) - \left(n_2 \log d_2 + \frac{1}{2} \log 2\pi d_2\right), \therefore,$$

$$\log \Omega = D \log D + \frac{1}{2} \log 2\pi D - d_1 \log d_1 - \quad (76)$$
$$d_2 \log d_2 - \frac{1}{2} \log(2\pi d_2 d_1) \text{ now } d_2 = D - d_1 \therefore$$

$$\log \Omega = D \log D + \frac{1}{2} \log 2\pi D - d_1 \log d_1 - \quad (77)$$
$$(D - d_1) \log(D - d_1) - \frac{1}{2} \log(2\pi\{D - d_1\} d_1)$$

$$0 = -d_1 \log D + d_1 \log D \quad (78)$$

$$\log \Omega = (D - d_1) \log D - d_1 \log\left(\frac{d_1}{D}\right) - \quad (79)$$
$$(D - d_1) \log(D - d_1) - \frac{1}{2} \log(2\pi\{D - d_1\} d_1) + \frac{1}{2} \log 2\pi D$$

$$\log \Omega = -d_1 \log\left(\frac{d_1}{D}\right) - \quad (80)$$
$$(D - d_1) \log\left(\frac{D - d_1}{D}\right) - \frac{1}{2} \log(2\pi\{D - d_1\} d_1) + \frac{1}{2} \log 2\pi D$$

Multiplied by D/D and defining $p_1$, Equations (81) to (87) are obtained:

$$\log \Omega = D\left(-\left(\frac{d_1}{D}\right) \log\left(\frac{d_1}{D}\right) - \left(\frac{D - d_1}{D}\right) \log\left(\frac{D - d_1}{D}\right) + \quad (81)$$
$$\frac{1}{2D} \log 2\pi D - \frac{1}{2D} \log(2\pi\{D - d_1\} d_1)\right)$$
$$= \frac{S}{k}$$

$$p_1 = \left(\frac{d_1}{D}\right) \quad (82)$$

$$\log \Omega = D\left(H - \frac{1}{2D} \log\left(\frac{\{D - d_1\} d_1}{D}\right)\right) \quad (83)$$
$$= \frac{S}{k},$$
$$\Omega = 2^{D\left(H - \frac{1}{2D} \log\left(\frac{\{D - d_1\} d_1}{D}\right)\right)}$$

$$H = \frac{S}{Dk} + \frac{1}{2D} \log\left(\frac{\{D - d_1\} d_1}{D}\right) \rightarrow \frac{S}{Dk} + \frac{1}{2D} \log\left(\frac{1}{D} \prod_{i=1}^{M} d_i\right) \quad (84)$$

for M types $$S = k \log \Omega = DkH - \varepsilon \quad (85)$$

$$\varepsilon = -\frac{k}{2} \log\left(\frac{1}{D} \prod_{i=1}^{M} d_i\right) \quad (86)$$

Boltzmann Entropy = $(Dk)$(Shannon Entropy) $- \varepsilon$ (87)

As noted above, the Stirling approximation is in error by 1% when D=10.

The next section illustrates the calculation of the "temperature" of revenue and cost. Equation (10) infers that the "temperature" of revenue is $r per unit and that of cost is $c per unit. The common thread running in many references is reflected in Equations (88) and (89):

Thermodynamic Engine: Work=Hot Input Energy− Cold Waste Energy (88)

Business Enterprise: $Profit=$Revenue−$Cost (89)

To move beyond analogies, such as Equation (88) and Equation (89) to useful quantitative equivalencies that result in a new Equation of Projected Cost Reduction as reflected in Equation (61), that is subject to testing, it is important to determine if Equation (10) is borne out analytically by the proposed methodology. A temperature of revenue can be computed.

From thermodynamics, "Temperature" of Revenue (which may be analogized to the hot source that provides heat to an engine) is reflected by Equation (53):

$$\left(\frac{\partial \text{Entropy}}{\partial \text{Energy}}\right)_{VN} = \frac{1}{\text{"Temperature" of Revenue}} \quad (53)$$

From Equation (51), it is shown that the entropy of revenue per month is entropy of revenue=$DH_m$, thus, as reflected in Equation (90):

$$H = -\sum_{i=1}^{m} p_i \log p_i = -\sum_{i=1}^{m} \left(\frac{d_i}{D}\right) \log\left(\frac{d_i}{D}\right) \quad (90)$$

The Energy of Revenue is analogous to the hot source heat energy, average revenue per unit, r, multiplied by the number of units produced per month $D=rD$, thus, as reflected in Equation (91):

$$\frac{\partial(\text{Entropy of Revenue})}{\partial(\text{Energy of Revenue})} \to \frac{d(DHm)}{d(rD)} = \frac{1}{\text{"Temperature" of Revenue}} = \frac{1}{T_R}. \quad (91)$$

Since neither D nor $H_m$ is a function of r, Equations (92) to (98) are expressed as:

$$\frac{d(DH_m)}{d(rD)} = \left(\frac{1}{r}\right)\frac{d}{dD}(DH_m) = \frac{H_m}{r} + \left(\frac{D}{r}\right)\frac{dH_m}{dD} = \frac{1}{T_R} \quad (92)$$

$$dH_m = \left(\frac{dH_m}{dD}\right)dD + \left(\frac{\partial H_m}{\partial m}\right)\left(\frac{\partial m}{\partial D}\right)dD \quad (93)$$

$$\left(\frac{\partial H_m}{\partial D}\right) = -\frac{\partial}{\partial D}\left(\sum_{i=1}^{m}\left(\frac{d_i}{D}\right)\log\left(\frac{d_i}{D}\right)\right) \quad (94)$$

$$\left(\frac{\partial H_m}{\partial D}\right) = -\left(\sum_{i=1}^{m} -\left(\frac{\partial}{\partial D}\right)\left(\frac{d_i}{D}\right)\log\left(\frac{d_i}{D}\right) + \left(\frac{d_i}{D}\right)\frac{\partial}{\partial D}\log\left(\frac{d_i}{D}\right)\right) \quad (95)$$

$$\frac{\partial}{\partial D}\left(\frac{d_i}{D}\right) = -\left(\frac{d_i}{D^2}\right), \frac{\partial}{\partial D}\log\left(\frac{d_i}{D}\right) = \frac{1}{d_i/D}\left(-\frac{d_i}{D^2}\right) = -\frac{1}{D} \quad (96)$$

$$\left(\frac{\partial H_m}{\partial D}\right) = -\left(\sum_{i=1}^{m} -\left(\frac{d_i}{D^2}\right)\log\left(\frac{d_i}{D}\right) + \left(\frac{d_i}{D}\right)\left(-\frac{1}{D}\right)\right) \quad (97)$$

$$\left(\frac{\partial H_m}{\partial D}\right) = \frac{1}{D}\left(\sum_{i=1}^{m} \left(\frac{d_i}{D}\right)\log\left(\frac{d_i}{D}\right) + \left(\frac{d_i}{D}\right)\right) = \frac{1}{D}(-H_m + 1) \quad (98)$$

The first term is expressed in Equation (98). The second term is expressed reflected in Equation (99):

$$\left(\frac{\partial H}{\partial m}\right)\left(\frac{\partial m}{\partial D}\right) \quad (99)$$

The derivative of Shannon entropy is reflected in Equations (100) and (101):

$$\left(\frac{\partial H}{\partial m}\right) = -\left(\frac{\Delta D}{D + \Delta D}\right)H_m - \left(\frac{D}{D + \Delta D}\right)\log\left(\frac{D}{D + \Delta D}\right) - \left(\frac{\Delta D}{D + \Delta D}\right)\log\left(\frac{\Delta D}{D + \Delta D}\right) \quad (100)$$

$$\frac{\Delta H}{\Delta m} = -\left(\frac{\Delta D}{D + \Delta D}\right)H_m + H_{D,\Delta D} \to -\left(\frac{\Delta D}{D}\right)H_m + H_{D,\Delta D} \quad (101)$$

$H_{D\Delta D}$=is Entropy of a binary random variable with values D and $\Delta D$.

In these equations, $H_{D\Delta D}$ represents entropy of a binary random variable with values D and $\Delta D$. If a uniform distribution of D unit spread among the m products is assumed, then a subset such as half the products m will be spread over half the demand D, and so on, as reflected in Equations (102) to (112):

$$\frac{m}{D} = \frac{\Delta m}{\Delta D} \quad (102)$$

$$\left(\frac{\partial H_m}{\partial m}\right)\left(\frac{\partial m}{\partial D}\right) = -\left(\frac{m}{D}\right)\left(\left(\frac{\Delta D}{D}\right)H_m + H_{D,\Delta D}\right) \quad (103)$$

$$dH_m = \left(\frac{\partial H_m}{\partial D}\right)dD + \left(\frac{\partial H_m}{\partial m}\right)\left(\frac{\partial m}{\partial D}\right)dD = \left(\frac{1}{D}(-H_m + 1)\right)dD - \left(\frac{m}{D}\right)\left(\left(\frac{\Delta D}{D}\right)H_m + H_{D,\Delta D}\right)dD \quad (104)$$

$$\frac{dH_m}{dD} = \left(\frac{1}{D}(-H_m + 1)\right) - \left(\frac{m}{D}\right)\left(\left(\frac{\Delta D}{D}\right)H_m + H_{D,\Delta D}\right) \quad (105)$$

$$\frac{d(DH_m)}{d(rD)} = \left(\frac{1}{r}\right)\frac{d}{dD}(DH_m) = \frac{1}{r}\left(H_m + D\frac{dH_m}{dD}\right) = \frac{1}{T_R} \quad (106)$$

$$\frac{1}{T_R} = \frac{1}{r}\left(H_m + D\left(\frac{1}{D}(-H_m + 1)\right) - \left(\frac{m}{D}\right)\left(\left(\frac{\Delta D}{D}\right)H_m + H_{D,\Delta D}\right)\right) \quad (107)$$

$$\frac{1}{T_R} = \frac{1}{r}\left(H_m - H_m + 1 - m\left(\left(\frac{\Delta D}{D}\right)H_m - \left(\frac{D}{D + \Delta D}\right)\log\left(\frac{D}{D + \Delta D}\right) - \left(\frac{\Delta D}{D + \Delta D}\right)\log\left(\frac{\Delta D}{D + \Delta D}\right)\right)\right) \quad (108)$$

$$m\left(\left(\frac{\Delta D}{D}\right)H_m - \left(\frac{D}{D + \Delta D}\right)\log\left(\frac{D}{D + \Delta D}\right) - \left(\frac{\Delta D}{D + \Delta D}\right)\log\left(\frac{\Delta D}{D + \Delta D}\right)\right) \to 0 \text{ as } \Delta D \to 0 \quad (109)$$

$$\frac{1}{T_R} \to \frac{1}{R}(H_m - H_m + 1) = \frac{1}{r} \quad (110)$$

-continued $$T_R = r \text{ as } \Delta D \to 0 \qquad (111)$$

$$\frac{d}{dD}(DH_m) \to 1 \text{ as } \Delta D \to 0 \qquad (112)$$

The "temperature" of Cost of Goods Sold is now described. The WIP, W, that is drawn in to serve demand D units with entropy $DH_m$ corresponds to entropy, as in Equation (52):

$$\text{Generalized Entropy=log } W = H_{intrinsic} + H_{complexity} + \epsilon \log w_i \qquad (52)$$

In Equation (52), $H_{intrinsic}$ corresponds to $DH_m$. The energy related to cost of goods sold is cD where c is the average cost per unit, as reflected in Equations (113) and (114):

$$\frac{\partial(\text{Entropy of Cost of Goods Sold})}{\partial(\text{Energy of Cost of Goods Sold})} = \qquad (113)$$

$$\frac{1}{\text{"Temperature" of Cost Goods Sold}} = \frac{1}{T_C}$$

$$\frac{\partial(H_{intrinsic} + H_{complexity} + \epsilon \log w_i)}{\partial(cD)} = \qquad (114)$$

$$\frac{\partial(DH_m + H_{complexity} + \epsilon \log w_i)}{c\partial(D)} = \frac{1}{T_C}$$

Because all variables are independent of c, from the conclusion following Equation (36), $H_{complexity}$ and $\epsilon \log w_i$ are also independent of D. Therefore, as reflected in Equations (115) to (117):

$$\frac{\partial(DH_m + H_{complexity} + \epsilon \log w_i)}{c\partial(D)} = \left(\frac{1}{c}\right)\frac{\partial}{\partial D}(DH_m) = \frac{1}{T_C} \qquad (115)$$

$$\frac{\partial}{\partial D}(DH_m) \cong 1 \qquad (116)$$

$$T_C = c, \text{ as } \Delta D \to 0 \qquad (117)$$

The next section describes a derivative of discrete Shannon entropy. To evaluate an expression for the derivative of the discrete Shannon entropy as a function of increasing the number of products m is needed, as reflected in Equations (118) to (120):

$$\text{Shannon Entropy} = -\sum_{i=1}^{m} p_i \log p_i \qquad (118)$$

$$p_i = \frac{d_i}{D} \qquad (119)$$

$$D = \sum_{i=1}^{m} d_i, \qquad (120)$$

In these equations, m represents a number of different products, D represents a total number of products produced per month, $d_i$ represents a number of the $i^{th}$ product type produced per month.

One assumption is that a number of different outcomes increases from m to m+1 and adds $d_{m+1}$ to D, hence $d_{m+1} = \Delta D$. For $i \leq m$, $d_i$ are unchanged, as reflected in Equations (121) to (134):

$$p'_i = \frac{d_i}{D + \Delta D} \qquad (121)$$

$$\frac{\Delta H}{\Delta m} = \frac{H_{m+1} - H_m}{\Delta m = 1} \qquad (122)$$

$$H_{m+1} = -\sum_{i=1}^{m+1} p'_i \log p'_i = -\left[\left(\sum_{i=1}^{m+1}\left(\frac{d_i}{D+\Delta D}\right)\log\left(\frac{d_i}{D+\Delta D}\right)\right)\right] \qquad (123)$$

$$H_{m+1} = -\sum_{i=1}^{m+1} p'_i \log p'_i = \qquad (124)$$
$$-\left[\left(\sum_{i=1}^{m}\left(\frac{d_i}{D+\Delta D}\right)\log\left(\frac{d_i}{D+\Delta D}\right)\right) + \left(\frac{\Delta D}{D+\Delta D}\right)\log\left(\frac{\Delta D}{D+\Delta D}\right)\right]$$

$$H_{m+1} = -\left[\left(\sum_{i=1}^{m}\left(\frac{d_i}{D}\right)\left(\frac{D}{D+\Delta D}\right)\log\left(\left(\frac{d_i}{D}\right)\left(\frac{D}{D+\Delta D}\right)\right)\right) + \qquad (125)$$
$$\left(\frac{\Delta D}{D+\Delta D}\right)\log\left(\frac{\Delta D}{D+\Delta D}\right)\right]$$

$$H_{m+1} = -\left[\left(\left(\frac{D}{D+\Delta D}\right)\sum_{i=1}^{m}\left(\frac{d_i}{D}\right)\left(\log\left(\frac{d_i}{D}\right) + \log\left(\frac{D}{D+\Delta D}\right)\right)\right) + \qquad (126)$$
$$\left(\frac{\Delta D}{D+\Delta D}\right)\log\left(\frac{\Delta D}{D+\Delta D}\right)\right]$$

$$\sum_{i=1}^{m}\left(\frac{d_i}{D}\right)\log\left(\frac{d_i}{D}\right) = -H_m, \sum_{i=1}^{m}\left(\frac{d_i}{D}\right) = 1 \qquad (127)$$

$$H_{m+1} = -\left(\frac{D}{D+\Delta D}\right)\left(-H_m + \log\left(\frac{D}{D+\Delta D}\right)\right) + \left(\frac{\Delta D}{D+\Delta D}\right)\log\left(\frac{\Delta D}{D+\Delta D}\right) \qquad (128)$$

$$H_{m+1} = -\left(\frac{D}{D+\Delta D}\right)\left(-H_m + \log\left(\frac{D}{D+\Delta D}\right)\right) - \left(\frac{\Delta D}{D+\Delta D}\right)\log\left(\frac{\Delta D}{D+\Delta D}\right) \qquad (129)$$

$$H_{m+1} = \qquad (130)$$
$$\left(\frac{DH_m}{D+\Delta D}\right) - \left(\frac{D}{D+\Delta D}\right)\log\left(\frac{D}{D+\Delta D}\right) - \left(\frac{\Delta D}{D+\Delta D}\right)\log\left(\frac{\Delta D}{D+\Delta D}\right)$$

$$\left(\frac{DH_m}{D+\Delta D}\right) = \left(\frac{(D+\Delta D)H_m - \Delta D H_m}{D+\Delta D}\right) = H_m - \left(\frac{\Delta D H_m}{D+\Delta D}\right) \qquad (131)$$

$$H_{m+1} = \qquad (132)$$
$$H_m - \left(\frac{\Delta D H_m}{D+\Delta D}\right) - \left(\frac{D}{D+\Delta D}\right)\log\left(\frac{D}{D+\Delta D}\right) - \left(\frac{\Delta D}{D+\Delta D}\right)\log\left(\frac{\Delta D}{D+\Delta D}\right)$$

$$\frac{\Delta H}{\Delta m} = \frac{H_{m+1} - H_m}{\Delta m = 1} = -\left(\frac{\Delta D}{D+\Delta D}\right)H_m - \left(\frac{D}{D+\Delta D}\right)\log\left(\frac{D}{D+\Delta D}\right) - \qquad (133)$$
$$\left(\frac{\Delta D}{D+\Delta D}\right)\log\left(\frac{\Delta D}{D+\Delta D}\right)$$

$$\frac{\Delta H}{\Delta m} = -\left(\frac{\Delta D}{D+\Delta D}\right)H_m + H_{N,\Delta N} \to -\left(\frac{\Delta D}{D}\right)H_m + H_{N,\Delta N} \qquad (134)$$

In the above equations, $H_{N\Delta N}$ represents entropy of a binary random variable with outcomes N and $\Delta N$. Substituting the approximation, as reflected in Equations (135) to (139):

$$\left(\frac{\Delta D}{D+\Delta D}\right) \cong \left(\frac{D}{D}\left(1 - \frac{\Delta D}{D}\right)\right) = \left(1 - \frac{\Delta D}{D}\right) \qquad (135)$$

$$-\left(\frac{D}{D+\Delta D}\right)\log\left(\frac{D}{D+\Delta D}\right) = -\left(1 - \frac{\Delta D}{D}\right)\log\left(1 - \frac{\Delta D}{D}\right) \qquad (136)$$

$$\log\left(1 - \frac{\Delta D}{D}\right) \cong -\frac{\Delta D}{D} \qquad (137)$$

$$-\left(\frac{D}{D+\Delta D}\right)\log\left(\frac{D}{D+\Delta D}\right) = -\left(1-\frac{\Delta D}{D}\right)\left(-\frac{\Delta D}{D}\right) \cong \frac{\Delta D}{D} \quad (138)$$

$$\frac{\Delta H}{\Delta m} = \frac{\Delta D}{D}\left(1 - H_m - \log\left(\frac{\Delta D}{D}\right)\right) \quad (139)$$

In other examples, m→m+1, but D remains constant, for example, yielding the same equations as reflected above.

Microeconomic analogies can be denoted in reference to their thermodynamic counterparts with the subscript M. Little's Law resulted in Equation (22), which provided the analogy that process:

1. Mass=$M_M$→$W^2$,
2. Internal Process Temperature $T_M$→$D^2$
3. Volume=$V_M$→WIP W,
4. Entropy Change=$S_M$ at constant temperature→$\log(W_f/W_i)$.
5. $n_M R_M$=1 comparing Equation (32) with Equation (9) discussed below
6. Energy=$E_M$=Prenergy=½($Mv^2$)=½($D^2$)
7. $n_M R_M$=1: Referring back to analogy 5, $n_M R_M$=1, note that $R_M$ is a universal constant. Their product can be unity if $R_M$=1/$n_M$ and hence either $R_M$ is not a universal constant if $n_M$ is extensive, or $n_M$=$R_M$=1 in which case $R_M$ is a universal constant and $n_M$=1. The later case is selected in which is a universal $R_M$ constant, to continue the discussion.

Proof that Mass=$W^2$ is the Self-Consistent Parsing of Equation (14)

It can be shown how a self-consistent parsing of the acceleration from Equation (14) into factors of mass (Equation (140)), and force (Equation (141)):

$$\text{Acceleration} = a = \frac{dv}{dt} = -\frac{D}{W^2}\frac{dW}{dt} \text{ cycles/hour/hour} \quad (14)$$

$$(\text{Mass})_M = W^2 \quad (140)$$

$$(\text{Force})_M = -D\frac{dW}{dt} \quad (141)$$

This is the parsing consistent with units of measure of energy in which an integration resulted in Equation (22) where there are units of measure of the square of a velocity.

An alternative parsing of Equation (14) is to incorporate D as a factor in the mass rather than the force, as reflected in Equation (142) to (144):

$$(\text{Mass})_M = \frac{W^2}{D} \quad (142)$$

$$(\text{Force})_M = -\frac{dW}{dt}, \text{ then} \quad (143)$$

$$\text{Prenergy} = \int_{S_i}^{S_f} F\,ds \quad (144)$$
$$= \int\left(-\frac{dW}{dt}\right)\left(\frac{D}{W}dt\right)$$
$$= -D\int_{W_i}^{W_f}\frac{dW}{W}$$
$$= -D(\log W_f - \log W_i).$$

The units of measure resulting from this alternative parsing are inconsistent with a kinetic energy because there is a velocity D units per unit time, not a velocity squared and can be rejected based on the criterion of units of measure of kinetic energy. Several other tests of the parsing Equation (141) can be explored to show it is entirely consistent with the results of thermodynamics and statistical mechanics. More importantly, it is the parsing that led to Equation (22) with the result $-D^2(\log W_f - \log W_i)$ indicating that the entropy of a process is a function of log W that leads to the application of Information Theory, ultimately leading to the equation of cost reduction.

Equation (22) was derived in analogy with the isothermal compression of an ideal gas. It can be determined if the four analogies above are self-consistent with the equation of state of an ideal gas. From Thermodynamics it is known, as reflected in Equation (145):

$$\text{Pressure} = P \quad (145)$$
$$= T\left(\frac{\partial S}{\partial V}\right)_U \to D^2\left(\frac{\partial}{\partial W}\log W\right)_{\frac{D^2}{2}}$$
$$= \frac{D^2}{W}$$
$$= P_M$$

At first glance the expression for pressure does not appear to be an intensive variable, because the expression shown in Equation (145) includes an extensive quantity W. The units of measure of pressure in a microeconomic process can be studied by considering a small displacement, ds, as reflected in Equation (146):

$$(\text{Pressure})_{UnitsOfMeasure} = \quad (146)$$
$$\left(\frac{\text{Force}}{\text{Area}} = \frac{F}{A} = \frac{Fds}{Ads} = \frac{\text{Energy}}{\text{Volume}}\right)_{UnitsOfMeasure}$$

Thus, the units of measure of pressure are Force/Area or Energy/Volume, and the latter can be used for this purpose. The numerator is $D^2$ which is in units of Prenergy and the denominator is in units of Volume equivalent WIP, as reflected in Equation (147):

$$\text{Pressure} = P \quad (147)$$
$$= \frac{\text{Energy} \to D^2}{\text{Volume} \to W} \to \frac{D^2}{W} \to$$
$$\frac{\text{Energy}}{\text{Unit Volume, Intensive Variable}}$$

Substituting this equation into the Ideal Gas Law with Volume→W, as reflected in Equation (148), results in Equation (149), where $n_M R_M$=1.:

$$PV = nRT \quad (148)$$

$$PV = \left(\frac{D^2}{W}\right)(W) = D^2 \quad (149)$$

Hence, it can be concluded that the WIP obeys the Ideal Gas Law, as reflected in Equation (150):

$$P_M V_M = D^2 \qquad (150)$$

The WIP can include particles which obey the Ideal Gas Law as derived from Little's Law resulting in the analogies above. The average velocity of ideal gas particles may be derived from the entirely different starting point of Newtonian mechanics. However, as discussed, on average each particle of WIP is coupled to every other particle of WIP and acts as a single unit. Instead of substituting the mass of a single particle into the average velocity formula, one can substitute the mass $M_M = W^2$ and temperature $T_M = D^2$ and of the internal process into Maxwell's velocity law to again determine consistency. Maxwell determined that a gas has energy ½ kT per degree of freedom. Integrating Little's Law over one dimension, as reflected in Equations (151) and (152), which is analogous to Little's Law if $k_M = 1$:

$$\frac{1}{2} M V^2 = \frac{1}{2} kT \qquad (151)$$

$$V = \sqrt{\frac{kT}{M}} \rightarrow \sqrt{\frac{k_M D^2}{W^2}} = \frac{D}{W}\sqrt{k_M} \qquad (152)$$

That an analogy based on Little's Law should square with Maxwell's velocity based on Newtonian dynamics can be surprising. The conclusion that the internal Boltzmann constant for a microeconomic process is $k_M = 1$ provides the linkage between statistical mechanics, Information Theory and microeconomics. In the discussion following Equation (22) it was noted that $n_M R_M = 1$ and that $T = D^2$. It can be seen that this is in fact consistent with Little's Law, as reflected in Equation (153):

$$Boltzmann\ S = -k \sum_{i=1}^{m} p_i \log p_i \rightarrow -1 \sum_{i=1}^{m} p_i \log p_i \qquad (153)$$
$$= Shannon\ H$$

That the Boltzmann constant internal to a process indicates that a process is controlled by information. The connection to the better known version of the Boltzmann equation S=k log Ω, where Ω is the number of states is derived above. The Internal Process microeconomic Boltzmann constant $k_M = 1$.

Therefore a microeconomic process can be an information based, rather than a physical, process. It should also be noted that the analogies mass $M_M = W^2$ and temperature $T_M = D^2$ will satisfy Equation (152) resulting in units of measure of a velocity.

It has been described that the microeconomic analogies, as tested thus far, satisfy the requirements of an ideal gas. Now compare the entropy of a mixture of ideal gases as derived from statistical mechanics versus the statistically derived equation for microeconomic entropy of WIP consisting of a mixture of different products. First recall that WIP moves in one dimension in Little's Law, as opposed to three dimensions for an ideal gas, as was pointed out in the derivation of Equation (152). One can examine the entropy of a One Dimensional ideal gas consisting of D atoms, of Q different types of atoms, there being $d_i$ indistinguishable atoms within a given type, each of mass $m_i$ where, as reflected in Equation (154):

$$D = \sum_{i=1}^{Q} d_i \qquad (154)$$

The equation for the entropy of a mixture of ideal gases can be derived from statistical mechanics, as reflected in Equations (155) and (156), where h represents Planck's constant:

$$S = DR\left\{\frac{3}{2} + \ln\left(\frac{U^{1/2}V}{D^{3/2}}\right) - \sum_{i=1}^{Q}\frac{d_i}{D}\ln\sigma_i - \sum_{i=1}^{Q}\frac{d_i}{D}\ln\left(\frac{d_i}{D}\right)\right\} \qquad (155)$$

$$\sigma_i = \left(\frac{1h^2}{4\pi m_i}\right)^{1/2} \qquad (156)$$

Equation (157) is used to determine if the microeconomic entropy of WIP in Equation (36) is consistent with the entropy of an ideal gas:

$$\log_2 W = -\sum_{i=1}^{Q} p_i \log_2 p_i + \sum_{i=1}^{Q} p_i \log_2 w_i = H_Q + \sum_{i=1}^{Q} p_i \log_2 w_i \qquad (157)$$

Equations (155) and (156) first derive an expression for the mass of the WIP of a product type, $m_i$ to be used in above. Begin with the case for WIP consisting of just two products Q=2, as reflected beginning with Equations (158) and (159):

$$M = W^2 = (w_1 + w_2)^2 \qquad (158)$$
where
$$W = (w_1 + w_2) = \sum_{i=1}^{Q} w_i$$

$$M = (w_1 + w_2)^2 = w_1^2 + w_1 w_2 + w_2 w_1 + w_2^2 \qquad (159)$$

If the quantity per type regresses to the mean, as reflected in Equations (160) to (163) (which can be generalized for 3 products, as reflected in Equation (162)):

$$w_1 \approx w_2 \approx \langle w_i \rangle = \text{average over all } i. \therefore, \qquad (160)$$

$$M = (w_1 + w_2)^2 \approx w_1^2 + w_1 w_2 + w_2 w_1 + w_2^2 = 2w_1^2 + 2w_2^2 \qquad (161)$$

$$M = (w_1 + w_2 + w_3)^2 = w_1^2 + w_2^2 + w_3^2 + 2w_1 w_2 + 2w_1 w_3 + 2w_3 w_2 \qquad (162)$$

$$m_i \approx 3 w_i^2 \qquad (163)$$

In general, the $i^{th}$ product type makes a contribution, as reflected in Equation (164) to the total mass, as reflected in Equation (165):

$$m_i \approx Q \langle w_i \rangle^2 \qquad (164)$$

$$M \approx Q^2 \langle w \rangle^2 \qquad (165)$$

If Equation (164) is substituted and the macroeconomic analogies into Equations (155) and (156), Equations (166) and (167) are obtained:

$$S = D\left\{ \frac{3}{2} + \ln\left(\frac{\left(\frac{D^2}{2}\right)^{1/2} W}{D^{3/2}}\right) - \sum_{i=1}^{Q} \frac{d_i}{D}\ln\sigma_i - \sum_{i=1}^{Q} \frac{d_i}{D}\ln\left(\frac{d_i}{D}\right) \right\} \quad (166)$$

$$\sigma_i = \left(\frac{h^2}{4\pi m_i}\right)^{1/2} = \left(\frac{h^2}{4\pi Q w_i^2}\right)^{1/2} = \left(\frac{h}{w_i}\right)\sqrt{\frac{1}{4Q\pi}} \quad (167)$$

Substituting Equation (167) into Equation (166), results in Equations (168) to (170):

$$S = D\left\{ \frac{3}{2} + \ln\left(\frac{W}{\sqrt{2}\,D^{1/2}}\right) + \sum_{i=1}^{Q} \frac{d_i}{D}\ln\left(\frac{w_i}{h}\sqrt{4Q\pi}\right)_i - \sum_{i=1}^{Q} \frac{d_i}{D}\ln\left(\frac{d_i}{D}\right) \right\} \quad (168)$$

$$p_i = \frac{d_i}{D} \quad (169)$$

$$S = D\left\{ \frac{3}{2} + \ln\left(\frac{W}{\sqrt{2}\,D^{1/2}}\right) + \sum_{i=1}^{Q} p_i \ln\left(\frac{w_i}{h}\sqrt{4Q\pi}\right)_i - \sum_{i=1}^{Q} p_i \ln p_i \right\} \quad (170)$$

If $\frac{1}{h}\sqrt{4Q\pi}$ is moved out of the brackets in the $3^{rd}$ term in Equation (170), Equation (171) results:

$$S = D\left\{ \begin{array}{c} \frac{3}{2} + \ln\left(\frac{W}{\sqrt{2}\,D^{1/2}}\right) + \frac{Q\sqrt{4Q\pi}}{h} + \\ \sum_{i=1}^{Q} p_i \ln w_i - \sum_{i=1}^{Q} p_i \ln p_i \end{array} \right\} \quad (171)$$

Now it can be recalled that the entropy of WIP is, as reflected in Equation (172):

$$Entropy_M = \log_2 W \quad (172)$$

$$= \sum_{i=1}^{Q} p_i \ln w_i - \sum_{i=1}^{Q} p_i \ln p_i$$

Thus the log expectation and Shannon entropy of WIP in Equation (36) enters the entropy relationship in microeconomics just as the log expectation and Shannon entropy of molecules enter the entropy formula for a multi-component gas. This indicates again that the parsing of Mass=$W^2$ in Equation (15) based on the parsing Equation (141) is at least consistent with the equations of Statistical Mechanics.

An alternative comparison of Equation (170) to Equation (36) can be made. If $$\frac{1}{h}\sqrt{4Q\pi}$$

is not moved out of the $3^{rd}$ term in Equation (170), the resulting comparison with Equation (36) implies Equation (173):

$$\frac{1}{h_M}\sqrt{4Q\pi} = 1,\ h_M \approx 3.5\sqrt{Q} \quad (173)$$

The microeconomic equivalent of Planck's constant, is expressed reflected in Equation (174):

$$h_M \approx 3.5\sqrt{Q} \quad (174)$$

This microeconomic equivalent is not a universal constant since Q, the number of different products, does change as a function of complexity reduction and hence falls afoul of the logic above leading up to $n_M = R_M = 1$. The relationship in Equation (174), however unlikely, can be tested by statistical simulations of microeconomic processes.

The process for the derivation of Equation (164) for total mass can be used and can be applied to total demand, as reflected in Equations (175) to (178):

$$D^2 = \left(\sum_{i=1}^{Q} d_i^2\right) \cong Q^2 \langle d_i \rangle^2 \quad (175)$$

$$v = \sqrt{\frac{kT}{M}} \rightarrow \sqrt{\frac{k_M D^2}{W^2}} \cong \sqrt{\frac{k_M Q^2 \langle d_i \rangle^2}{Q^2 \langle w_i \rangle^2}} = \left(\frac{\langle d_i \rangle}{\langle w_i \rangle}\right)\sqrt{k_M} \quad (176)$$

$$\left(\frac{\langle d_i \rangle}{\langle w_i \rangle}\right) = \left(\frac{D}{W}\right); \quad (177)$$

$$v = \left(\frac{D}{W}\right)\sqrt{k_M} \quad (178)$$

The above equations again illustrate the collective motion of WIP as distinguish from the individual motion of gas molecules.

Process improvement can also be compared to the thermodynamics of a nozzle. Taking a global view, process improvement can be viewed as a methodology which accelerates low velocity WIP into high velocity WIP at the same demand rate D. The thermodynamic analogy of process improvement is that of a mechanical nozzle which similarly accelerates low velocity gas to a higher velocity at the same overall flow rate. The thermodynamic equations of a nozzle provide another test of the analogies and therefore the parsing Equation (141). The Thermodynamic equations of a nozzle are, as reflected in Equation (179):

$$\Delta(KineticEnergy)_{Nozzle} = \Delta(U) \quad (179)$$

$$= -\underbrace{\int_{Pi}^{Pr} V\,dP}_{Flow\text{-}Expansion} - $$

$$\underbrace{\int_{Si}^{Sr} T\,dS}_{Entropy\ Dissipation}$$

In Equation (179), V represents Volume, S represents entropy, P represents pressure, T represents temperature, and U represents kinetic energy. In the first term, dP is negative, and VdP is the difference between differential flow work, d(VP), and differential expansion work, PdV, since VdP=d(VP)−PdV. The second term on the right-hand side of Equation (179) is the energy dissipation of the nozzle due to entropy created by friction in the flow process. In a thermodynamic process, reduction of mechanical friction may increase final velocity and kinetic energy. However, in the case of a microeconomic process, kinetic energy is, as reflected in Equation (180):

$$U = \text{Kinetic energy} \tag{180}$$
$$= \frac{1}{2}Mv^2 \rightarrow \frac{1}{2}W^2\left(\frac{D}{W}\right)^2$$
$$= \frac{D^2}{2}$$
$$= \text{Prenergy,}$$

Thus in a microeconomic process, an increase in velocity does not increase Prenergy due to the dependence of process inertia upon velocity. First take the case of D as a constant exogenous parameter, then, as reflected in Equation (181):

$$\Delta U = \Delta\left(\frac{D^2}{2}\right) = 0 \tag{181}$$

The left side of Equation (179) is zero. Substitution of the microeconomic analogies derived in Section A and Equation (145) into the right side of Equation (179) also may yield zero. There are expressions for all thermodynamic variables in Equation (179) in terms of their microeconomic analogies.

An expression for pressure has been derived in Equation (145):

$$\text{Pressure} = P \tag{145}$$
$$= T\left(\frac{\partial S}{\partial V}\right)_U \rightarrow D^2\left(\frac{\partial}{\partial W}\log W\right)_{\frac{D^2}{2}}$$
$$= \frac{D^2}{W}$$

Therefore, as reflected in Equation (182), with expressions for V, T, S from above, the right side of Equation (179) becomes Equation (183):

$$dP = d\left(\frac{D^2}{W}\right)_{\frac{D^2}{2}} = -\frac{D^2}{W^2}dW \tag{182}$$

$$-\int_{Pi}^{P_f} V dP - \int_{Si}^{S_f} T dS \rightarrow -\int_{Wi}^{W_f} W\left(-\frac{D^2}{W^2}dW\right) - \int_{Wi}^{W_f} D^2 \frac{dW}{W} = \tag{183}$$
$$\int_{Wi}^{W_f} D^2 \frac{dW}{W} - \int_{Wi}^{W_f} D^2 \frac{dW}{W} = 0$$

The above equations show that the derived microeconomic analogies based on the parsing Equation (141) are self consistent with the thermodynamic equations of a nozzle.

Prinertia $M_M = W^2$ Even When Demand D is Variable

An expression has been derived for process inertia of $W^2$ when exogenous demand, D, is constant. A check can be made to determine if Prinertia remains $W^2$ when demand is variable. First take the derivative of the velocity, Equation (13) with $dD/dt \neq 0$ and obtain Equation (184):

$$\text{Acceleration} = \frac{dv}{dt} = \frac{d}{dt}\left(\frac{D}{W}\right) \tag{184}$$
$$= \frac{1}{W}\left(\frac{dD}{dt}\right) - \frac{D}{W^2}\left(\frac{dW}{dt}\right)$$

The showing can be made that $M = W^2$ and determine if the resulting Prenergy is still self-consistent; Equation (28). Because, as reflected in Equations (185) and (186), $1/W^2$ can be factored out of Equation (184):

$$\text{Force} = \frac{\text{Acceleration}}{\text{Mass} = W^2} \tag{185}$$

$$\text{Force} = \left(W\left(\frac{dD}{dt}\right) - D\left(\frac{dW}{dt}\right)\right), \tag{186}$$

Recalculating Prenergy between the pair of initial values $(W_i, D_i)$ and final values $(W_f, D_f)$, in which Demand D is an exogenous market variable and not a function of internal W, as reflected in Equations (187) to (191):

$$\text{Prenergy} = \int_{Di,Wi}^{D_f,W_f} F ds \tag{187}$$
$$= \int_{Di,Wi}^{D_f,W_f} \left(W\left(\frac{dD}{dt}\right) - D\left(\frac{dW}{dt}\right)\right)\left(\frac{D}{W}dt\right)$$

$$\text{Prenergy} = \int_{Di,Wi}^{D_f,W_f} W\left(\frac{dD}{dt}\right)\left(\frac{D}{W}dt\right) - \int_{Di,Wi}^{D_f,W_f} D\left(\frac{dW}{dt}\right)\left(\frac{D}{W}dt\right) \tag{188}$$

$$\text{Prenergy} = \tag{189}$$
$$\int_{Di}^{D_f} D dD - \int_{Di,Wi}^{D_f,W_f} D^2 \frac{dW}{W} = \left(\frac{1}{2}D^2\right)\Big|_{Di}^{D_f} - (D^2 \log W)\Big|_{Di,Wi}^{D_f,W_f}$$

$$\text{Prenergy} = \frac{1}{2}(D_f^2 - D_i^2) - (D_f^2 \log W_f - D_i^2 \log W_i) \tag{190}$$

as $D_f \rightarrow D_i$, $\text{Prenergy} \rightarrow -D^2(\log W_f - \log W_i)$ \hfill (191)

If $D_f \neq D_i$ but there is no process improvement, i.e., in the above case studies, where $W_i = W_f$, and, as reflected in Equation (192):

$$\text{Prenergy Change} = \frac{1}{2}(D_f^2 - D_i^2) - (D_f^2 - D_i^2)\log W \tag{192}$$

Notice that the resulting increase in Kinetic Energy due to the increase in D is reduced by the second term which is analogous to the frictional force in a nozzle which appears as the second term in Equation (179), as reflected in Equation (193):

$$\text{Prenergy Change} = -\int_{Si}^{S_f} T dS \rightarrow -(D_f^2 - D_i^2)\log W \tag{193}$$

In a second example, D is constant $D_i = D_f = D$, but $W_i \geq W_f$ due to process improvement is reflected in Equation (194):

$$\text{Prenergy Change} = -\int_{Si}^{S_f} T\, dS \to -D^2(\log W_f - \log W_i) \quad (194)$$

Equation (194) agrees with the case when $D_f = D_i$ and is self-consistent with the hypothesis that Prinertia=$W^2$ for both constant and variable demand, D. This allows the use of Prinertia=$W^2$ when considering growth in demand, D, by scaling the WIP in proportion to the demand at a fixed percent of total capacity. Revenue growth can require these concepts and concepts from statistical mechanics. A conclusion is the result of the trials is that the assumption that Prinertia=$W^2$ is self-consistent and leads to process entropy of log W for constant and variable demand.

Thus, thermodynamics applies to microeconomics. Little's Law led to an expression for process entropy of log W, resulting in Prinertia of $W^2$, and internal temperature $D^2$, volume=WIP, W. The substitution of these values into the Kinetic Theory of Gases, the Statistical Mechanics of entropy of a mixture of gasses, as well as the thermodynamics of a nozzle were consistent with thermodynamics. Queuing Theory can be connected with Entropy. The resulting decomposition of W in Equation (36) led to Information Theory. Thermodynamics is a macroscopic approximation of Statistical Mechanics. The demonstration by Jaynes that Z, the Partition Function from which thermodynamic variables are determined, is a consequence of maximizing Shannon's Entropy of Information. In this view, Statistical Mechanics, and therefore Thermodynamics, is not a physical theory at all, but rather is a branch of Information Theory.

The statistical nature of thermodynamics is not apparent in macroscopic measurements due to the extreme sharpness of the probability of states as a function of energy, for example as reflected in Equation (195):

$$\frac{\Delta E}{E} \cong \frac{1}{f} \equiv 10^{-12} \quad (195)$$

because $f$ = degrees of freedom $\equiv 10^{24}$

For example, in the case of a process, each unit of WIP has one degree of freedom and WIP is seldom less than 1000 units. Hence variability of cost of $\leq 2\%$ can be expected.
Table 3 is a consolidated Table of Thermodynamic→microeconomic Analogies Table 3 includes a summary of parameters in from thermodynamics and corresponding microeconomic parameters.

TABLE 3

| Thermodynamics → Microeconomic Process | | |
|---|---|---|
| Internal Process Parameters | | |
| 1. Universal Constants | R, k, n → | 1 |
| 2. Volume | V → | W No. of units of WIP |
| 3. Mass | M → | $W^2$ Inertia of Process |
| 4. Internal Temperature | T → | $D^2$ |
| 5. Energy to Compress Gas | nRTlogV → | $D^2$logW to accelerate WIP |
| 6. Kinetic Energy | $\frac{1}{2}Mv^2 \to$ | $\frac{1}{2}D^2$ Process Energy |

TABLE 3-continued

| Thermodynamics → Microeconomic Process | | |
|---|---|---|
| 7. Entropy, T = Const. | nRlogV → | logW |
| 8. Pressure | P → | $\frac{D^2}{W}$ |
| 9. Equation of State | PV = nRT → | PV = $D^2$ | note:
D is the external demand of the market in units/unit time,
Q is the number of different types of products or tasks

| External Process Parameters | | |
|---|---|---|
| 10. External Source Temp | $T_H \to$ | r = $revenue/unit |
| External Sink Temp | $T_C \to$ | c = $cost/unit |
| Gas Constant | $R_e \approx$ | 0.1 (case study estimate) |

Figure 8:
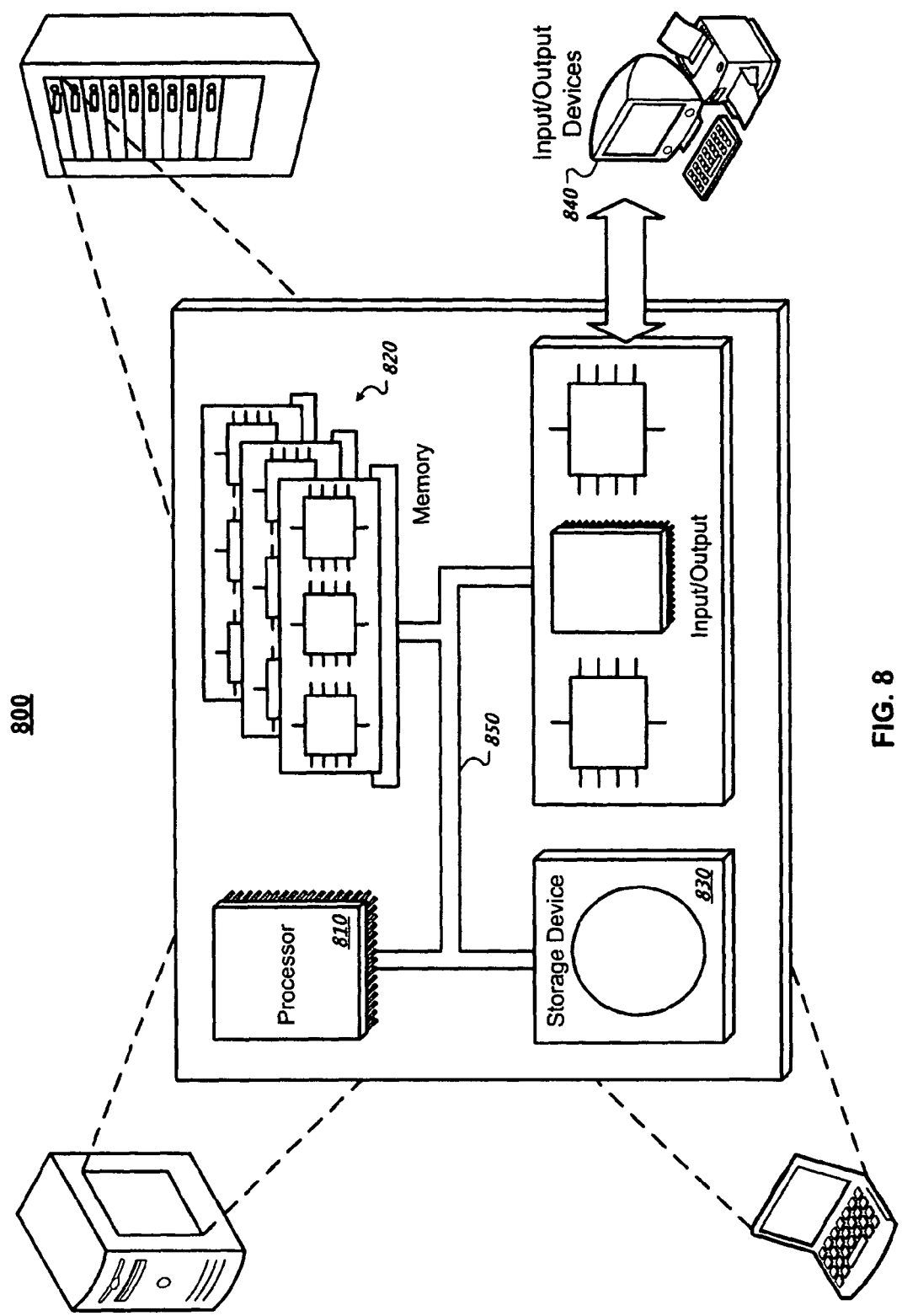
FIG. 8 is a schematic diagram of an exemplary system.
Like reference numbers represent corresponding parts throughout.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A cost reduction system comprising:
a computer-readable storage medium storing a thermodynamic model that is configured to determine a predictive cost reduction for a process, the predictive cost reduction being derived from thermodynamic principles;
a processor configured to:
access parameters associated with a process, the parameters comprising:
a quantity of units of work-in-process at first and second times, and
first and second constants respectively indicative of growth between the first and second times, and of a reduction of the work-in-process to a reduction of cost,
apply the thermodynamic model to the accessed parameters, and
determine a predictive cost reduction associated with a contemplated improvement of the process, using:

$$\text{Predictive Cost Reduction} = 1 + R_e \log_2\left(\frac{\alpha_R W_f}{W_i}\right),$$

wherein:
$R_e$ represents the second constant,
$W_f$ represents the quantity of units of the work-in-process at the second time,
$W_i$ represents the quantity of units of the work-in-process at the first time, and
$\alpha_R$ represents a ratio of the growth at the first time to the value of the growth at the second time; and
an output module configured to output the determined predictive cost reduction.

2. A computer-implemented method:
accessing parameters associated with a process, the parameters comprising:
a quantity of units of work-in-process at first and second times, and
first and second constants respectively indicative of growth between the first and second times, and of a reduction of the work-in-process to a reduction of cost;
applying, by one or more computers, a thermodynamic model to the accessed parameters, wherein applying the thermodynamic model further comprises determining the predictive cost reduction using:

$$\text{Predictive Cost Reduction} = 1 + R_e \log_2\left(\frac{\alpha_R W_f}{W_i}\right),$$

wherein:
$R_e$ represents the second constant,
$W_f$ represents the quantity of units of the work-in-process at the second time,
$W_i$ represents the quantity of units of the work-in-process at the first time, and
$\alpha_R$ represents a ratio of the growth at the first time to the value of the growth at the second time; and
outputting, based on applying the thermodynamic model, the predictive cost reduction associated with a contemplated improvement of the process.

3. The computer-implemented method of claim 2, wherein the thermodynamic model is derived from Carnot's equation.

4. The computer-implemented method of claim 3, wherein the thermodynamic model derived from Carnot's equation comprises an expression analogous to Carnot's equation, the expression being derived from Little's Law.

5. The computer-implemented method of claim 3, wherein the cost reduction is proportional to the logarithm of a reduction in the quantity of units of work-in-process from the first time to the second time.

6. The computer-implemented method of claim 2, wherein the second constant indicative of a reduction in work-in-process to a reduction in cost comprises a constant indicative of a reduction in entropy corresponding to a reduction in cost.

7. The computer-implemented method of claim 2, wherein the first constant indicative of growth comprises a ratio of an economic value at the second time and the economic value at the first time.

8. The computer-implemented method of claim 7, wherein the economic value at the second time represents demand at the second time, and the economic value at the first time represents demand at the first time.

9. The computer-implemented method of claim 7, wherein the economic value at the second time represents revenue at the second time, and the economic value at the first time represents revenue at the first time.

10. The computer-implemented method of claim 7, wherein the economic value at the second time represents units produced at the second time, and the economic value at the first time represents units produced at the first time.

11. The computer-implemented method of claim 2, wherein the second constant has a value between 0.09 and 0.11.

12. The computer-implemented method of claim 2, further comprising determining the first and second constants based on empirical data.

13. The computer-implemented method of claim 2, wherein the process comprises value-added costs and non-value added costs, and the non-value added costs comprise 50% or more of a total cost associated with the process.

14. The computer-implemented method of claim 13, wherein the non-value added costs comprise rework of at least one of the units of work-in-process, the rework including performing the at least one of the units of work in process more than one time.

15. The computer-implemented method of claim 14, wherein the total cost associated with the process is driven by the rework.

16. The computer implemented method of claim 2, further comprising modifying the process based on the predictive cost reduction.

17. A computer program product, tangibly embodied in a non-transitory machine-readable medium, the computer program product comprising instructions that, when read by a machine, operate to cause a data processing apparatus to:
access parameters associated with a process, the parameters comprising:
a quantity of units of work-in-process at first and second times, and
first and second constants respectively indicative of growth between the first and second times, and of a reduction of the work-in-process to a reduction of cost;
apply a thermodynamic model to the accessed parameter by determining the predictive cost reduction using:

$$\text{Predictive Cost Reduction} = 1 + R_e \log_2\left(\frac{\alpha_R W_f}{W_i}\right),$$

wherein:
$R_e$ represents the second constant,
$W_f$ represents the quantity of units of the work-in-process at the second time,
$W_i$ represents the quantity of units of the work-in-process at the first time, and
$\alpha_R$ represents a ratio of the growth at the first time to the value of the growth at the second time; and
output, based on applying the thermodynamic model, the predictive cost reduction associated with a contemplated improvement of the process.

18. The computer program product of claim 17, wherein the thermodynamic model is derived from Carnot's equation.

* * * * *